(12) United States Patent
Yuzuriha

(10) Patent No.: US 8,767,971 B2
(45) Date of Patent: Jul. 1, 2014

(54) SOUND PICKUP APPARATUS AND SOUND PICKUP METHOD

(75) Inventor: Shinichi Yuzuriha, Osaka (JP)

(73) Assignee: Panasonic Corporation, Osaka (JP)

( * ) Notice: Subject to any disclaimer, the term of this patent is extended or adjusted under 35 U.S.C. 154(b) by 292 days.

(21) Appl. No.: 13/061,963

(22) PCT Filed: Jun. 23, 2010

(86) PCT No.: PCT/JP2010/004170
§ 371 (c)(1),
(2), (4) Date: Mar. 3, 2011

(87) PCT Pub. No.: WO2011/010426
PCT Pub. Date: Jan. 27, 2011

(65) Prior Publication Data
US 2011/0158416 A1    Jun. 30, 2011

(30) Foreign Application Priority Data
Jul. 24, 2009  (JP) .................................. 2009-173734

(51) Int. Cl.
*H04R 5/00* (2006.01)
*H04R 3/00* (2006.01)

(52) U.S. Cl.
USPC .............................................. 381/26; 381/92

(58) Field of Classification Search
USPC .................................................... 381/26, 92
See application file for complete search history.

(56) References Cited

U.S. PATENT DOCUMENTS 5,664,021 A * 9/1997 Chu et al. ........................ 381/92
5,787,183 A   7/1998 Chu et al.
(Continued)

FOREIGN PATENT DOCUMENTS

| | | |
|---|---|---|
| CN | 101310558 | 11/2008 |
| JP | 9-505699 | 6/1997 |

(Continued)

OTHER PUBLICATIONS

International Search Report issued Sep. 28, 2010 in International (PCT) Application No. PCT/JP2010/004170.

(Continued)

*Primary Examiner* — Duc Nguyen
*Assistant Examiner* — Phan Le
(74) *Attorney, Agent, or Firm* — Wenderoth, Lind & Ponack, L.L.P.

(57) ABSTRACT

Provided is a sound pickup apparatus that increase the flexibility in installation of microphones, while enabling sound from a sound source to be picked up in stereo without using the information on the current positions of the microphones. The sound pickup apparatus includes a microphone (110) including 4 or more sound pickup units (110a to 110d) placed so as to have different main axis directions of directivity, the microphone being installed in a position where sound outputted from a loudspeaker can be picked up; a level calculating unit (112) configured to calculate a signal level of sound outputted from the loudspeaker for each output signal of the 4 or more sound pickup units (110a to 110d); a mixing coefficient calculating unit (113) configured to calculate mixing coefficients adjusted to the main axis directions of directivity of the 4 or more sound pickup units by using the signal level calculated by the level calculating unit; and a signal mixing unit (115) configured to generate a stereo signal by mixing output signals of the 4 or more sound pickup units by using the mixing coefficient calculated by the mixing coefficient calculating unit.

12 Claims, 18 Drawing Sheets

(56) References Cited

U.S. PATENT DOCUMENTS

| | | | |
|---|---|---|---|
| 8,135,143 B2 | 3/2012 | Ishibashi et al. | |
| 2008/0044033 A1* | 2/2008 | Ozawa | 381/26 |
| 2008/0205665 A1* | 8/2008 | Tokuda et al. | 381/92 |
| 2009/0052688 A1 | 2/2009 | Ishibashi et al. | |
| 2009/0279715 A1* | 11/2009 | Jeong et al. | 381/92 |
| 2010/0266139 A1 | 10/2010 | Yuzuriha et al. | |

FOREIGN PATENT DOCUMENTS

| | | |
|---|---|---|
| JP | 9-182044 | 7/1997 |
| JP | 2005-322953 | 11/2005 |
| JP | 2006-303839 | 11/2006 |
| WO | 95/10164 | 4/1995 |
| WO | 2009/075085 | 6/2009 |

OTHER PUBLICATIONS

Office Action issued Oct. 17, 2013 in corresponding Chinese Application No. 201080002533.3, with English translation of Search Report.

* cited by examiner

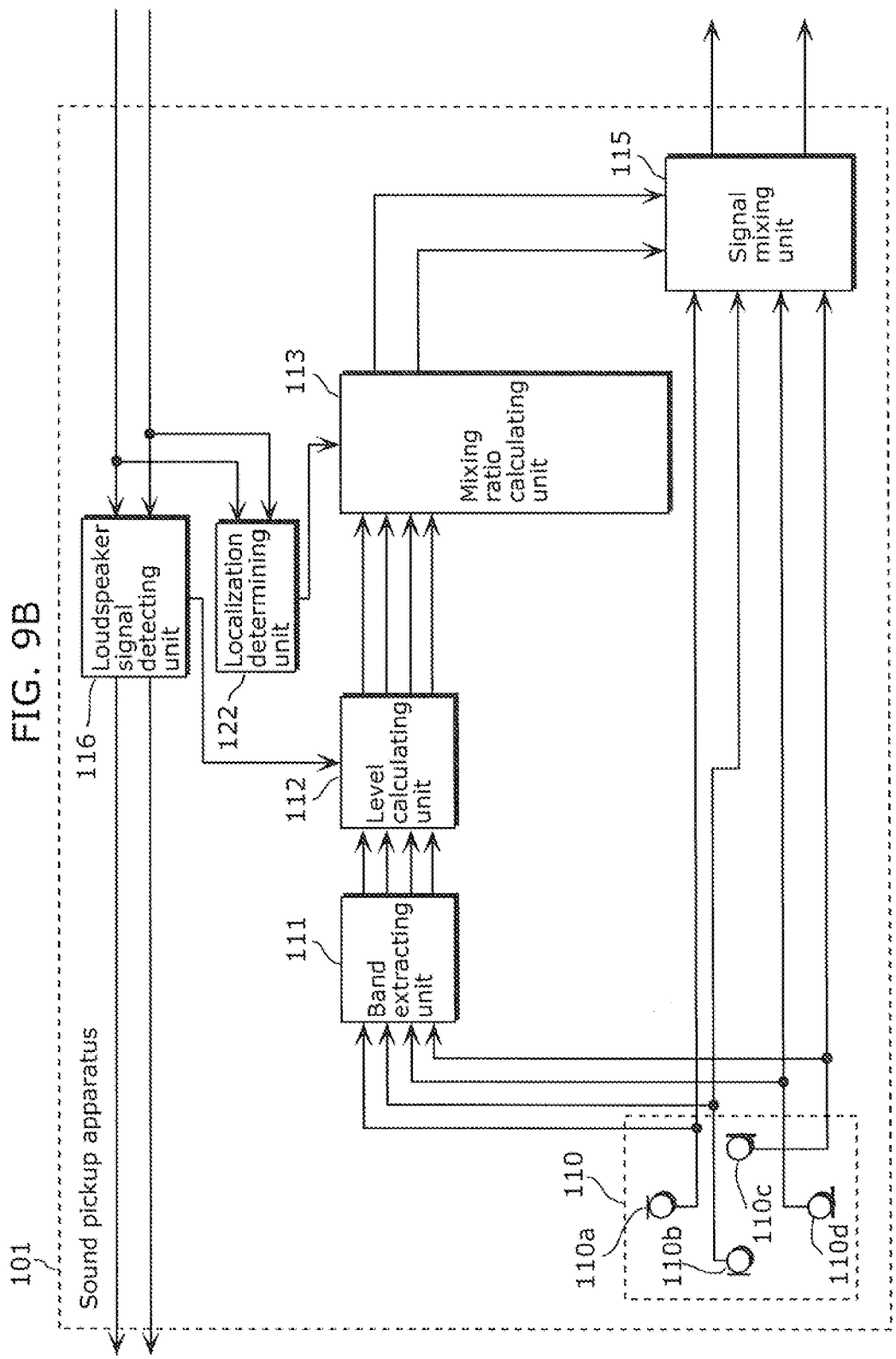

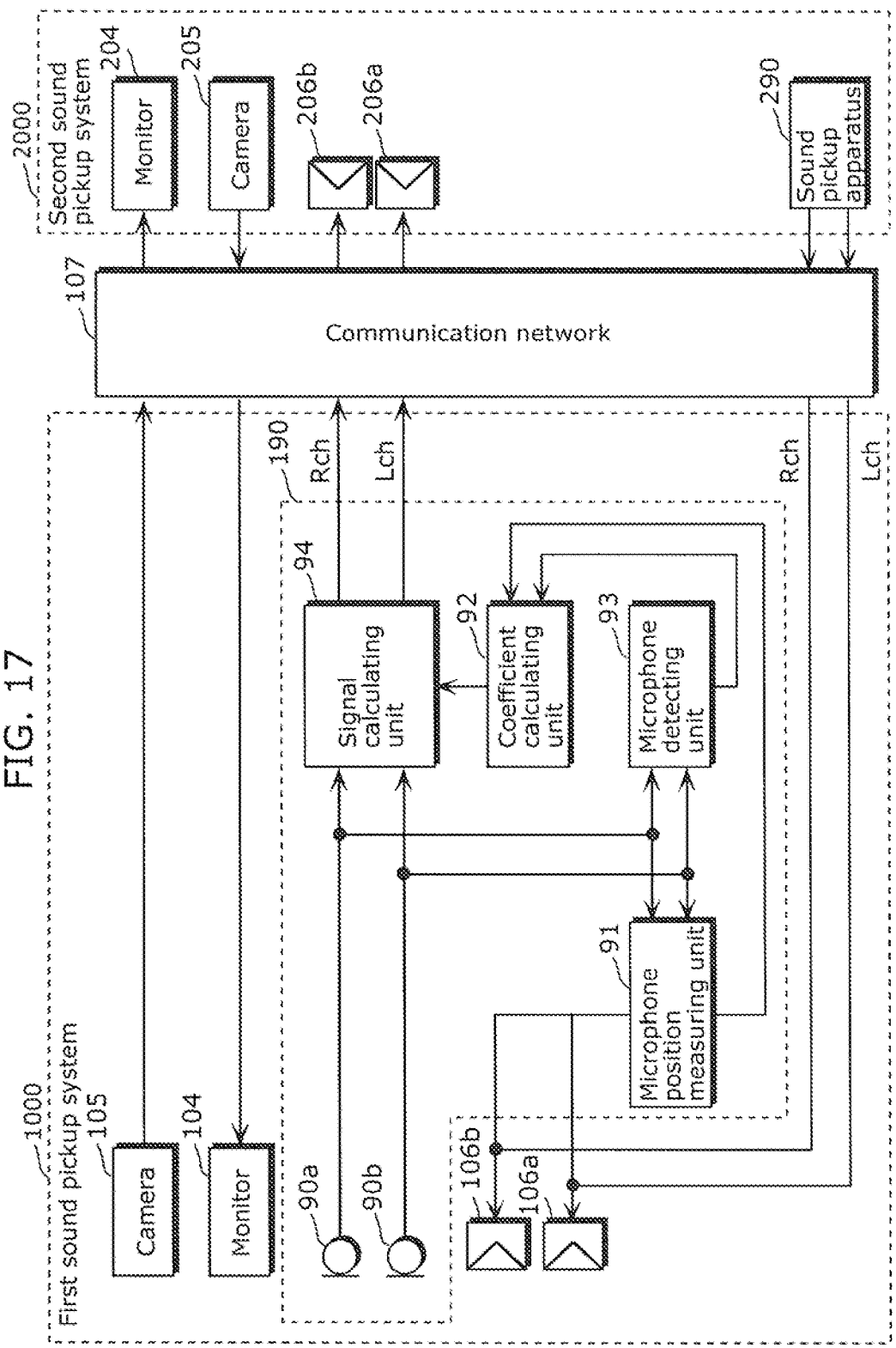

US 8,767,971 B2

SOUND PICKUP APPARATUS AND SOUND PICKUP METHOD

TECHNICAL FIELD

The present invention relates to a sound pickup apparatus and a sound pickup method, and particularly to a sound pickup apparatus and a sound pickup method for generating a stereo signal by using multiple microphones.

BACKGROUND ART

Conventionally, in an acoustic system for e.g., a video conference system, sound pickup apparatus using multiple microphones have been used to pick up sound clearly from a sound source (for example, a speaker). Such a sound pickup apparatus generates a multichannel signal for reproducing, for example, the position of a sound source of a communication user site at a communication partner site (achieving sound image localization) using multiple microphones.

In such a sound pickup apparatus, multiple microphones are provided corresponding to respective channels. Also, the multiple microphones are fixedly installed with respective main axis directions of directivity toward the directions according to the corresponding channels. The sound pickup apparatus then can generate each picked-up sound signal as a multichannel signal for achieving sound image localization. The generated multichannel signal is transmitted to multiple loudspeakers at the communication partner site via a communication network. Accordingly, multichannel sound is reproduced at the communication partner site, and the position of a speaker at the user site is reproduced at the communication partner site.

In order to generate a multichannel signal for achieving sound image localization, multiple microphones need to be fixedly installed with respective main axis directions of directivity toward the directions according to the corresponding channels. Thus, in the above-mentioned sound pickup apparatus, the speaker cannot freely change the arrangement positions of the multiple microphones.

Now, in order to solve the above-mentioned problem, a sound pickup apparatus 190 as shown in FIGS. 16 and 17 has been proposed (for example, see PTL 1). FIG. 16 is a schematic view of a conventional sound pickup system. FIG. 17 is a block diagram showing the functional configuration of a conventional video conference system. As shown in FIG. 17, the video conference system includes a first sound pickup system 1000 installed at a user site, and a second sound pickup system 2000 installed at a communication partner site. Because the second sound pickup system 2000 has a configuration similar to that of the first sound pickup system 1000, a schematic view of the second sound pickup system 2000 is omitted in FIG. 16.

In the examples of FIGS. 16 and 17, a right channel (hereinafter referred to as a "R channel" or "Rch") signal, and a left channel (hereinafter referred to as an "L channel" or "Lch") signal are generated as multichannel signals, and stereo reproduction is achieved at the communication partner site.

A microphone 90a is installed on a table 103 so as to be placed in the front vicinity of a speaker 102a. A microphone 90b is installed on a table 103 so as to be placed in the front vicinity of a speaker 102b. A monitor 104 is a device for displaying an image captured by a camera 205 at the communication partner site, and is installed in front of the speakers 102a, 102b. The image of the communication partner site is inputted to the monitor 104 via a communication network 107.

A camera 105 is installed on the upper portion of the monitor 104, and captures the speakers 102a, 102b at the user site. The image of the user site is transmitted to a monitor 204 of the communication partner site via the communication network 107.

The first and second loudspeakers 106a, 106b reproduce an L channel signal or a R channel signal inputted from a sound pickup apparatus 290 of the communication partner site via the communication network 107. The first and second loudspeakers 106a, 106b are each installed on either side of the monitor 104. Similarly, a first loudspeaker 206a of the communication partner site is installed on the front left as viewed from the communication partner, and a second loudspeaker 206b of the communication partner site is installed on the front right as viewed from the communication partner.

The sound pickup apparatus 190 is installed at the user site, and the sound pickup apparatus 290 is installed at the communication partner site. Because the internal configuration of the sound pickup apparatus 290 is similar to that of the sound pickup apparatus 190, the drawing and description for the sound pickup apparatus 290 are omitted herein.

The sound pickup apparatus 190 includes the microphones 90a and 90b, a microphone position determining unit 91, a coefficient calculating unit 92, a microphone detecting unit 93, and a signal calculating unit 94. In the following, each component of the sound pickup apparatus 190 is specifically described.

The microphone position measuring unit 91 outputs a measurement signal to the first and second loudspeakers 106a, 106b. Subsequently, the microphone position measuring unit 91, after outputting the measurement signal, calculates a time period as a delay time until the measurement signal is picked up by the microphones 90a, 90b. The microphone position measuring unit 91 measures the current position of the microphones 90a, 90b using the calculated delay time.

In the example of FIG. 16, because the microphone 90a is placed on the right side position as viewed from the monitor 104, the right side position is measured as the current position of the microphone 90a. Also because the microphone 90b is placed on the left side position as viewed from the monitor 104, the left side position is measured as the current position of the microphone 90b. The microphone position measuring unit 91 measures those current positions for every movement of the microphones 90a, 90b so that a speaker can freely move the microphones 90a, 90b.

The coefficient calculating unit 92 calculates the ratio (coefficient ratio) between the level assigned to the R channel signal and the level assigned to the L channel signal based on the measured current positions of the microphones 90a, 90b so that multichannel signals for achieving sound image localization are generated.

In the example of FIG. 16, the measured current position of the microphone 90a is on the right as viewed from the monitor 104. Thus, the coefficient calculating unit 92 determines, for example, (R channel signal:L channel signal)=(1:0) as the coefficient ratio of the microphone 90a. On the other hand, the measured current position of the microphone 90b is on the left as viewed from the monitor 104. Thus, the coefficient calculating unit 92 determines, for example, (R channel signal:L channel signal)=(0:1) as the coefficient ratio of the microphone 90b.

When either one of the speakers 102a or 102b speaks, the microphone detecting unit 93 detects a microphone nearest to the speaker based on the levels of the picked-up sound signals from the microphones 90a, 90b. For example, when the speaker 102a speaks, the level of the picked-up sound signal from the microphone 90a becomes greater than that of the picked-up sound signal from the microphone 90b. In this case, the microphone detecting unit 93 detects the microphone 90a as the microphone nearest to the speaker. Subsequently, the coefficient calculating unit 92 determines the coefficient ratio for the microphone 90a, (R channel signal:L channel signal)=(1:0) as the coefficient ratio to be outputted to the signal calculating unit 94 based on the microphone 90a detected by the microphone detecting unit 93.

The signal calculating unit 94 calculates the R channel signal and L channel signal according to the determined coefficient ratio. For example, in the case where the coefficient ratio for microphone 90a is (R channel signal:L channel signal)=(1:0), the signal calculating unit 94 calculates the R channel signal by multiplying respective picked-up sound signals of the microphones 90a, 90b by a coefficient 1 and adding the multiplied picked-up sound signals. On the other hand, the signal calculating unit 94 calculates the L channel signal by multiplying respective picked-up sound signals of the microphones 90a, 90b by a coefficient 0 and adding the multiplied picked-up sound signals.

Accordingly, the R channel signal forms a signal to which all the picked-up sound signals from the microphones 90a, 90b are added, and the L channel signal has no output, thus multichannel signals for achieving sound image localization are generated. The L channel signal (Lch) and R channel signal (Rch) which are calculated in the signal calculating unit 94 are transmitted to the loudspeakers 206a, 206b of the communication partner site via the communication network 107. Accordingly, at the communication partner site, sound is reproduced as if the speaker 102a speaks from the right position as viewed from a speaker of the communication partner site.

In this manner, the sound pickup apparatus 190 shown in FIGS. 16 and 17 measures the position (current position) of each microphone after every movement of the microphone, and multichannel signals for achieving sound image localization are generated by using the information on the current position of the measured microphone. Consequently, the speaker can freely change the arrangement positions of the microphones.

CITATION LIST

Patent Literature

[PTL 1]
Japanese Unexamined Patent Application Publication No. 09-182044

SUMMARY OF INVENTION

Technical Problem

However, the sound pickup apparatus 190 shown in FIGS. 16 and 17 has the following problems.

(1) Because the sound pickup apparatus 190 performs processing using the information on the current position of the microphone, the position of the microphone needs to be measured before multichannel signals are generated (for example, before the start of conference).

(2) Because the sound pickup apparatus 190 performs processing using the information on the current position of the microphone, each time the position of a microphone is changed, for example, when a speaker moves the microphone in the conference, the conference is interrupted and the position of the microphone needs to be re-measured.

(3) Because each microphone can be moved freely by the speaker, the main axis direction of the directivity of the microphone is not necessarily toward the speaker, thus the microphone detected in the microphone detecting unit 93 actually may not be nearest to the speaker. In that case, the sound pickup apparatus 190 cannot pick up sound clearly from each sound source.

Now, the present invention has been made to solve the aforementioned problems, and it is an object of the invention to provide a sound pickup apparatus and a sound pickup method that increase the flexibility in installation of microphones, while enabling sound from a sound source to be picked up in stereo without using the information on the current positions of the microphones.

Solution to Problem

In order to achieve the above-mentioned object, a sound pickup apparatus according to one aspect of the present invention includes: a microphone including 4 or more sound pickup units placed so as to have different main axis directions of directivity, the microphone being installed in a position where sound outputted from a loudspeaker can be picked up; a level calculating unit configured to calculate a signal level of sound outputted from the loudspeaker for each output signal of the 4 or more sound pickup units; a mixing coefficient calculating unit configured to calculate a mixing coefficient adjusted to main axis directions of directivity of the 4 or more sound pickup units by using the signal level calculated by the level calculating unit; and a signal mixing unit configured to generate a stereo signal by mixing output signals of the 4 or more sound pickup units by using a mixing coefficient calculated by the mixing coefficient calculating unit.

According to this configuration, a mixing coefficient adjusted to the main axis direction of directivity can be calculated using the signal levels of the sound outputted from the loudspeakers. Therefore, sound from a sound source can be picked up in stereo without measuring the position of the microphone. Also, each microphone includes 4 or more sound pickup units having respective main axis directions of directivity being different from each other. Therefore, sound from a sound source located in the periphery of a microphone can be clearly picked up in stereo regardless of the orientation of the installed microphone, thus flexibility in installation of the microphones can be increased.

Preferably, the 4 or more sound pickup units are placed so as to have main axis directions of directivity separated by 90 degrees.

By this configuration, sound from a sound source located in the periphery of a microphone can be picked up in stereo more clearly regardless of the orientation of the installed microphone.

Preferably, the mixing coefficient calculating unit is configured to calculate the mixing coefficient so that the stereo signal is equivalent to a signal picked up in stereo from two sound pickup directions which are different from each other by 180 degrees.

By this configuration, stereo sound pickup with high channel separation can be achieved, thus sound from each sound source can be clearly picked up.

Preferably, the mixing coefficient includes a first mixing coefficient for generating one part of the stereo signal, and a second mixing coefficient for generating another part of the stereo signal; in each one of the 4 sound pickup units, the mixing coefficient calculating unit calculates the first mixing coefficient by using a signal level of another sound pickup unit located next to one side of the sound pickup unit, and calculates the second mixing coefficient by using a signal level of another sound pickup unit located next to another side of the sound pickup unit; and the signal mixing unit is configured to generate one part of the stereo signal by multiplying output signals of the 4 sound pickup units by the respective first mixing coefficients and adding the multiplied output signals together, and generates another part of the stereo signal by multiplying the output signals of the 4 sound pickup units by the respective second mixing coefficients and adding the multiplied output signals together.

According to this configuration, the mixing coefficient for each sound pickup unit can be calculated using the signal level of adjacent sound pickup units. Accordingly, compared with the case where the installation angle of each microphone is precisely calculated, the mixing coefficient can be calculated relatively easily, thus calculation load for calculating the mixing coefficient can be reduced.

Preferably, the sound pickup apparatus further includes a loudspeaker signal detecting unit configured to determine whether a loudspeaker signal for outputting sound from the loudspeaker is present or not, wherein the level calculating unit is configured to calculate the signal level in a case where a loudspeaker signal is determined to be present by the loudspeaker signal detecting unit.

According to this configuration, a signal level can be calculated from the signal outputted when a loudspeaker signal is determined to be present. Consequently, it is not necessary to output sound from each loudspeaker only for calculating the mixing coefficient, and for example, in a video conference system, the mixing coefficient also can be calculated using e.g., speaker's voice outputted from the loudspeaker.

Preferably, the sound pickup apparatus further includes a movement determining unit configured to determine whether the microphone is moved or not, wherein the mixing coefficient calculating unit sets a higher frequency of calculation of the mixing coefficient for a case where the microphone is determined to be moved than for a case where the microphone is determined to be still.

According to this configuration, when a microphone is moved, corresponding mixing coefficient is updated relatively quickly, while when a microphone is not moved, corresponding mixing coefficient is updated relatively slowly. Consequently, update responsiveness of the mixing coefficient to movement of each microphone can be improved, while the stability of the mixing coefficient also can be increased. Thus, sound from a sound source located in the periphery of a microphone can be picked up in stereo more clearly.

Preferably, the movement determining unit determines whether the microphone is moved or not based on a rate of change of the mixing coefficient calculated by the mixing coefficient calculating unit.

According to this configuration, a movement sensor or the like does not need to be installed in the microphone, thus whether the microphone is moved or not can be easily determined with a simple configuration.

Preferably, the sound pickup apparatus further includes a localization determining unit configured to determine a sound image localized position from a loudspeaker signal for outputting sound from the loudspeaker, wherein the mixing coefficient calculating unit is configured to calculate the mixing coefficient for each sound image localized position determined by the localization determining unit; and the signal mixing unit combines output signals of the 4 or more sound pickup units by using an average of mixing coefficient for each sound image localized position calculated by the mixing coefficient calculating unit.

According to this configuration, variation in the mixing coefficient due to a change of the sound image localized position of the sound outputted from the loudspeakers can be suppressed, thus sound can be picked up in stereo in a stable manner.

Preferably, the localization determining unit determines one of left localization, right localization, and center localization, as a sound image localized position, each localization indicating a relative positional relationship between the sound image localized position and the loudspeaker; and the level calculating unit includes: Lch level calculating unit configured to calculate the signal level in a case where sound image localized position is determined to be the left localization by the localization determining unit, Rch level calculating unit configured to calculate the signal level in a case where sound image localized position is determined to be the right localization by the localization determining unit, and Cch level calculating unit configured to calculate the signal level in a case where sound image localized position is determined to be the center localization by the localization determining unit.

According to this configuration, a mixing coefficient can be calculated for each of three types of sound image localized positions: left, right, and center.

Preferably, the sound pickup apparatus further includes a movement determining unit configured to determine whether the microphone is moved or not, wherein in a case where the microphone is determined to be moved, the mixing ratio calculating unit calculates a mixing coefficient of a sound image localized position whose signal level is not calculated yet after the microphone is determined to be moved by using a signal level of a sound image localized position whose signal level is already calculated after the microphone is determined to be moved.

According to this configuration, even in the case where there are some sound image localized positions whose signal levels have not been updated after a microphone is moved, the mixing coefficient after the movement of the microphone can be calculated with a higher precision.

Preferably, the sound pickup apparatus further includes a band extracting unit configured to extract a signal in a predetermined frequency band from each of output signals of the 4 or more sound pickup units, wherein the level calculating unit calculates the signal level using a signal extracted by the band extracting unit.

According to this configuration, when a mixing coefficient is calculated, influence of sound other than the sound needed to calculate the mixing coefficient (for example, noise) can be suppressed, thus the mixing coefficient can be calculated with a higher precision.

Preferably, the predetermined frequency band is a voice band.

According to this configuration, when a mixing coefficient is calculated by using, for example, a speaker's voice outputted from a loudspeaker, the mixing coefficient can be calculated with a higher precision.

A sound pickup method according to one aspect of the present invention is a sound pickup method for generating a stereo signal by using a microphone which has 4 or more sound pickup units placed so as to have different main axis directions of directivity, the microphone being installed in a position where sound outputted from a loudspeaker can be picked up, the sound pickup method including: calculating a signal level of sound outputted from the loudspeaker for each output signal of the 4 or more sound pickup units; calculating a mixing coefficient adjusted to main axis directions of directivity of the 4 or more sound pickup units by using a signal level calculated in the calculating of a signal level; and generating a stereo signal by mixing the output signals of the 4 or more sound pickup units by using a mixing coefficient calculated in the calculating of a mixing coefficient.

Thereby, effects similar to those of the above-mentioned sound pickup apparatus can be achieved.

An integrated circuit according to one aspect of the present invention is an integrated circuit for generating a stereo signal by using a microphone which has 4 or more sound pickup units placed so as to have different main axis directions of directivity, the microphone being installed in a position where sound outputted from a loudspeaker can be picked up, the integrated circuit including: a level calculating unit configured to calculate a signal level of sound outputted from the loudspeaker for each output signal of the 4 or more sound pickup units; a mixing coefficient calculating unit configured to calculate a mixing coefficient adjusted to main axis directions of directivity of the 4 or more sound pickup units by using a signal level calculated by the level calculating unit; and a signal mixing unit configured to generate a stereo signal by mixing output signals of the 4 or more sound pickup units by using a mixing coefficient calculated by the mixing coefficient calculating unit.

Thereby, effects similar to those of the above-mentioned sound pickup apparatus can be achieved.

Also, the present invention can be achieved as a program for making a computer to execute each step included in the above-described sound pickup method. And it is needless to state that such a program can be distributed via recording media such as a CD-ROM (Compact Disc Read Only Memory), or via transmission media such as the Internet.

Advantageous Effects of Invention

According to the present invention, a mixing coefficient adjusted to the main axis direction of directivity can be calculated using the signal levels outputted from the loudspeakers. Therefore, sound from a sound source can be picked up clearly in stereo without measuring the positions of the microphones. Also, each microphone includes 4 or more sound pickup units having respective main axis directions of directivity being different from each other. Therefore, sound from a sound source located in the periphery of a microphone can be clearly, picked up in stereo regardless of the orientation of the installed microphone, thus flexibility in installation of the microphones can be increased.

BRIEF DESCRIPTION OF DRAWINGS

FIG. 9B is a block diagram showing the functional configuration of a sound pickup apparatus according to a modification example of Embodiment 4 of the present invention.

FIG. 17 is a diagram showing the configuration of a conventional video conference system.

DESCRIPTION OF EMBODIMENTS

In the following, embodiments of the present invention are described with reference to the drawings.

Embodiment 1

A sound pickup apparatus according to Embodiment 1 of the present invention is described with reference to FIGS. 1 to 3.

Figure 1:
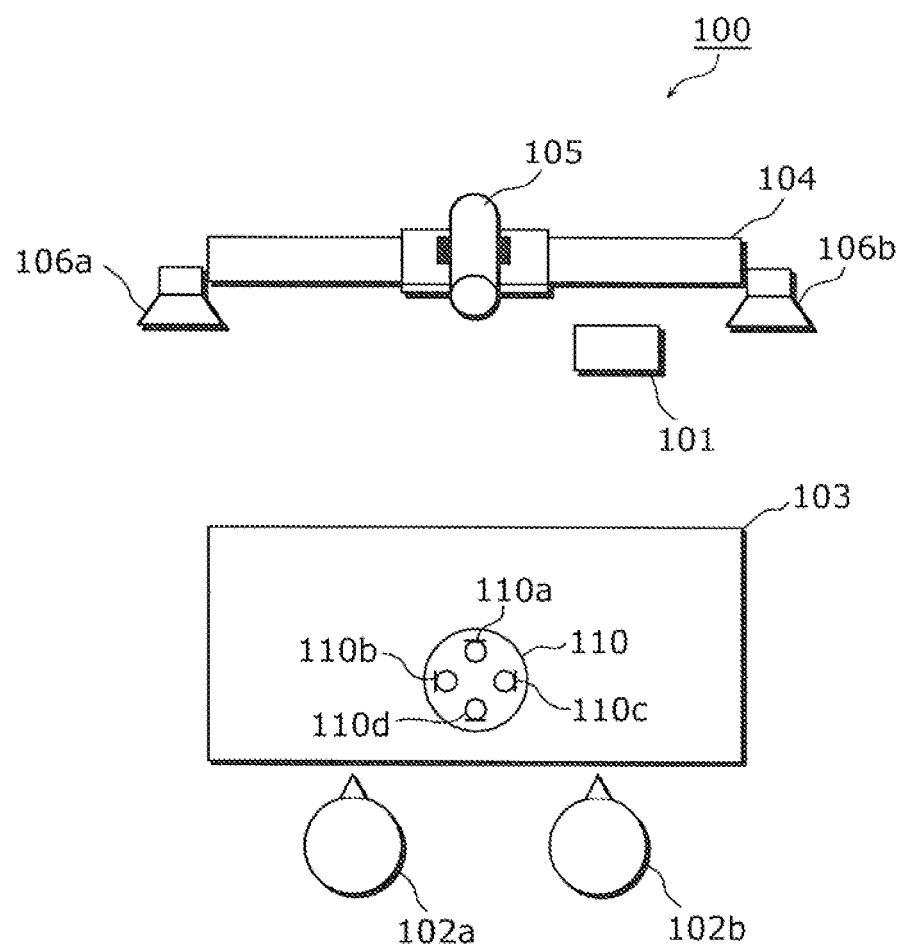
FIG. 1 is a schematic view of a sound pickup system according to Embodiment 1 of the present invention.
Figure 2:
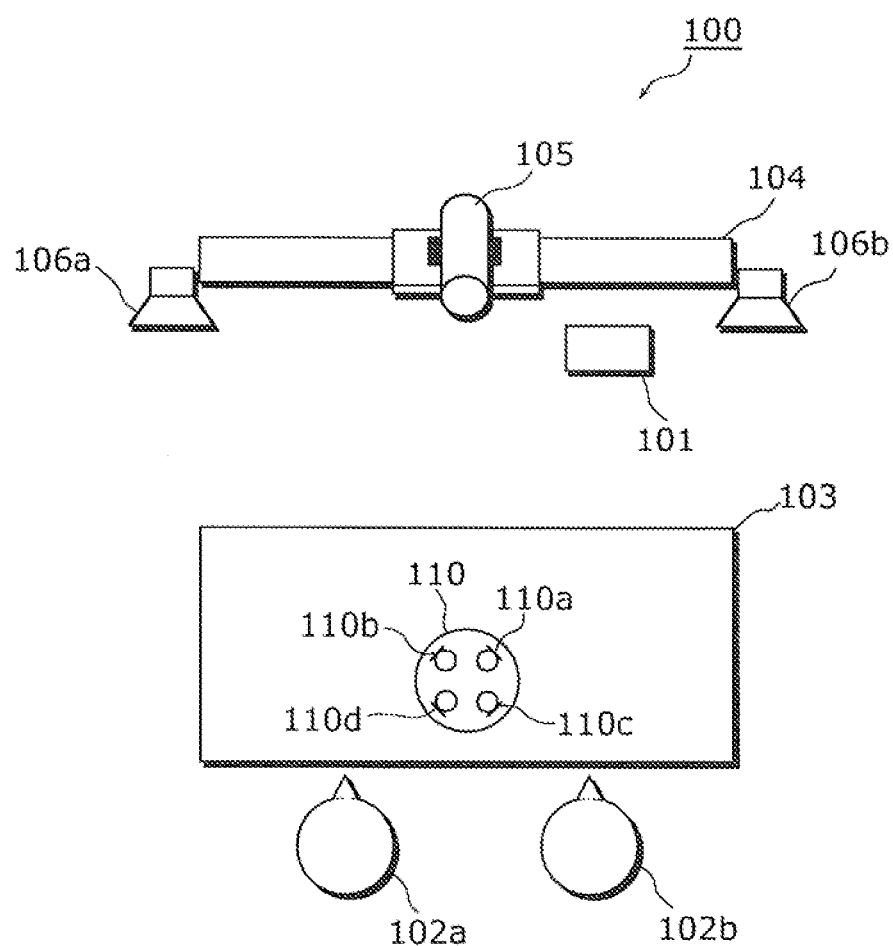
FIG. 2 is a schematic view of the sound pickup system according to Embodiment 1 of the present invention.

FIGS. 1 and 2 are schematic views of the sound pickup system according to Embodiment 1 of the present invention. Note that FIG. 1 and FIG. 2 are identical except that the installation directions of the sound pickup units in FIG. 2 are rotated 45 degrees in a clockwise direction from those in FIG. 1. Also, FIG. 3 is a diagram showing the configuration of the video conference system according to Embodiment 1 of the present invention.

In the present embodiment, R channel signal and L channel signal are generated as stereo signals, and stereo reproduction is achieved at the communication partner site. Also, each sound pickup unit is represented by a circle and a line segment in the drawings, and the direction from the center of the circle to a tangent point between the circle and the line segment indicates the main axis direction of directivity of the sound pickup unit.

A video conference system is installed for a first sound pickup system 100 installed at the user site, and the communication partner site which is physically separated from the user site. The video conference system includes the first sound pickup system 100, and the second sound pickup system 200 connected via the communication network 107 such as the Internet.

Figure 16:
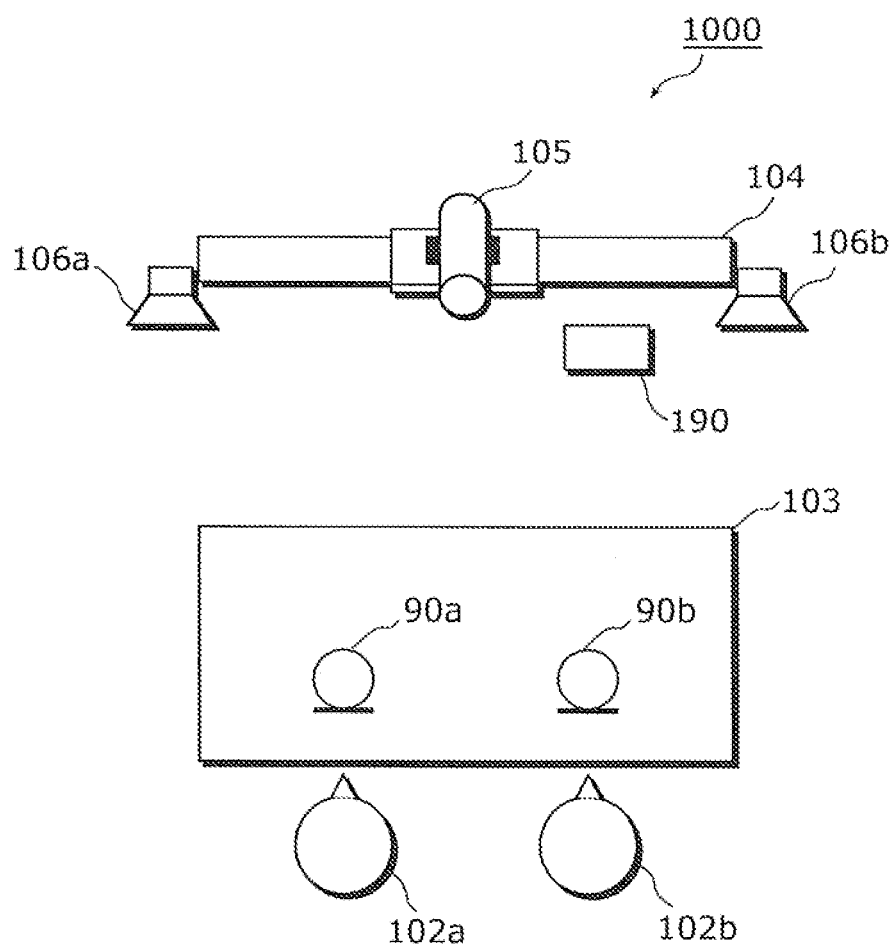
FIG. 16 is a schematic view of a conventional sound pickup system.

As shown in FIGS. 1 and 2, the first sound pickup system 100 includes a sound pickup apparatus 101, a monitor 104, a camera 105, a first loudspeaker 106a, and a second loudspeaker 106b. The second sound pickup system 200 is assumed to be similar to the first sound pickup system 100, thus schematic view of the second sound pickup system 200 is omitted. The second sound pickup system 200 is not limited to a system similar to the first sound pickup system 100, and may be similar to the conventional system shown in FIG. 16 (a second sound pickup system 2000).

The sound pickup apparatus 101 picks up sound in stereo from a sound source (for example, a speaker 102a or 102b). The sound pickup apparatus 101 includes a microphone 110 which has a first to fourth sound pickup units 110a to 110d. In the present embodiment, the microphone 110 is laid on a table 103 placed in front of the speakers 102a, 102b. The microphone 110 does not necessarily needs to be laid on the table 103, and may be installed in a position where the sound outputted from the first and second loudspeakers 106a, 106b can be picked up.

The monitor 104 is installed in front of the speakers 102a, 102b. The monitor 104 receives an image captured by the second sound pickup system 200 via the communication network 107, and displays the image.

The camera 105 is installed on the upper portion of the monitor 104 to capture the speakers 102a, 102b. An image signal generated by the camera 105 is transmitted to the second sound pickup system 200 via the communication network 107.

The first loudspeaker 106a is placed on the right side as viewed from the monitor 104 (on the left side as viewed from the speakers 102a, 102b). The first loudspeaker 106a reproduces L channel signal inputted from the second sound pickup system 200 via the communication network 107.

The second loudspeaker 106b is placed on the left side as viewed from the monitor 104 (on the right side as viewed from the speakers 102a, 102b). The second loudspeaker 106b reproduces R channel signal inputted from the second sound pickup system 200 via the communication network 107.

Next, the reason why the microphone 110 includes 4 or more sound pickup units is described.

In a video conference system, the microphone 110 is often placed in the middle of the table 103, thus needs to pick up sound from all the directions of 360 degree. For example, in the case where 2 unidirectional sound pickup units of the first order gradient are used to pick up sound, 2 sound pickup units are installed so that the main axis directions of directivity are different from each other by 180 degrees in order to obtain channel separation for sound pickup on the left and right as well as to pick up sound from all the directions of 360 degree.

Also, in the case where sound is picked up in stereo in e.g., a video conference system, intelligibility of sound as well as realistic sensation can be improved by matching the directions of an image and its sound (sound image) with each other.

However, in the case where installation of the microphone is left to a user, it is rarely expected that the user installs it in consideration of the main axis direction of directivity of the microphone. Thus, it is desirable that sound is picked up in stereo so that the directions of an image and its sound match with each other even in the case where the user has no such consideration.

However, in the case where two sound pick up units are used as described above, the main axis directions of directivity are different from each other by 180 degrees. Accordingly, the sound pickup directions on the left and right (the direction of sound picked up in a focused manner) are fixed once the microphone is installed, thus the channel separation for sound pickup on the left and right depend on the installation direction of the microphone.

In the case where 3 sound pickup units are used, the main axis directions of directivity of adjacent sound pickup units are different from each other by 120 degrees. Accordingly, for example, in the case where 2 sound pickup units pick up sound from the front on the left and right, only 1 sound pickup unit can pick up the sound from the rear. Consequently, the sound from the rear cannot be separated into the left and right components. That is to say, even with combined output signals from 3 sound pickup units, it is difficult to achieve stereo sound pickup having a high channel separation for any direction.

Thus, in the present embodiment, the microphone 110 includes 4 or more sound pickup units with respective main axis directions of directivity being different from each other. Thereby, the sound pickup apparatus 101 can pick up sound from all the directions of 360 degree, and enables sound to be picked up in stereo with secured channel separation into the left and right sides.

Specifically, the first to fourth sound pickup units 110a to 110d are placed so as to have main axis directions of directivity separated by 90 degrees. More specifically, the first to fourth sound pickup units 110a to 110d are arranged to be placed at different positions for every 90 degree on a circle, and the main axis directions of directivity of respective sound pickup units are toward the outer side from the center of each circle, and are separated by 90 degrees.

The main axis directions of directivity of the first to fourth sound pickup units 110a to 110d do not need to be separated precisely by 90 degrees, and may be separated substantially by 90 degrees. In other words, the first to fourth sound pickup units 110a to 110d may be placed so as to have the main axis directions of directivity separated by an angle which is assumed to be approximately 90 degrees.

Figure 4:
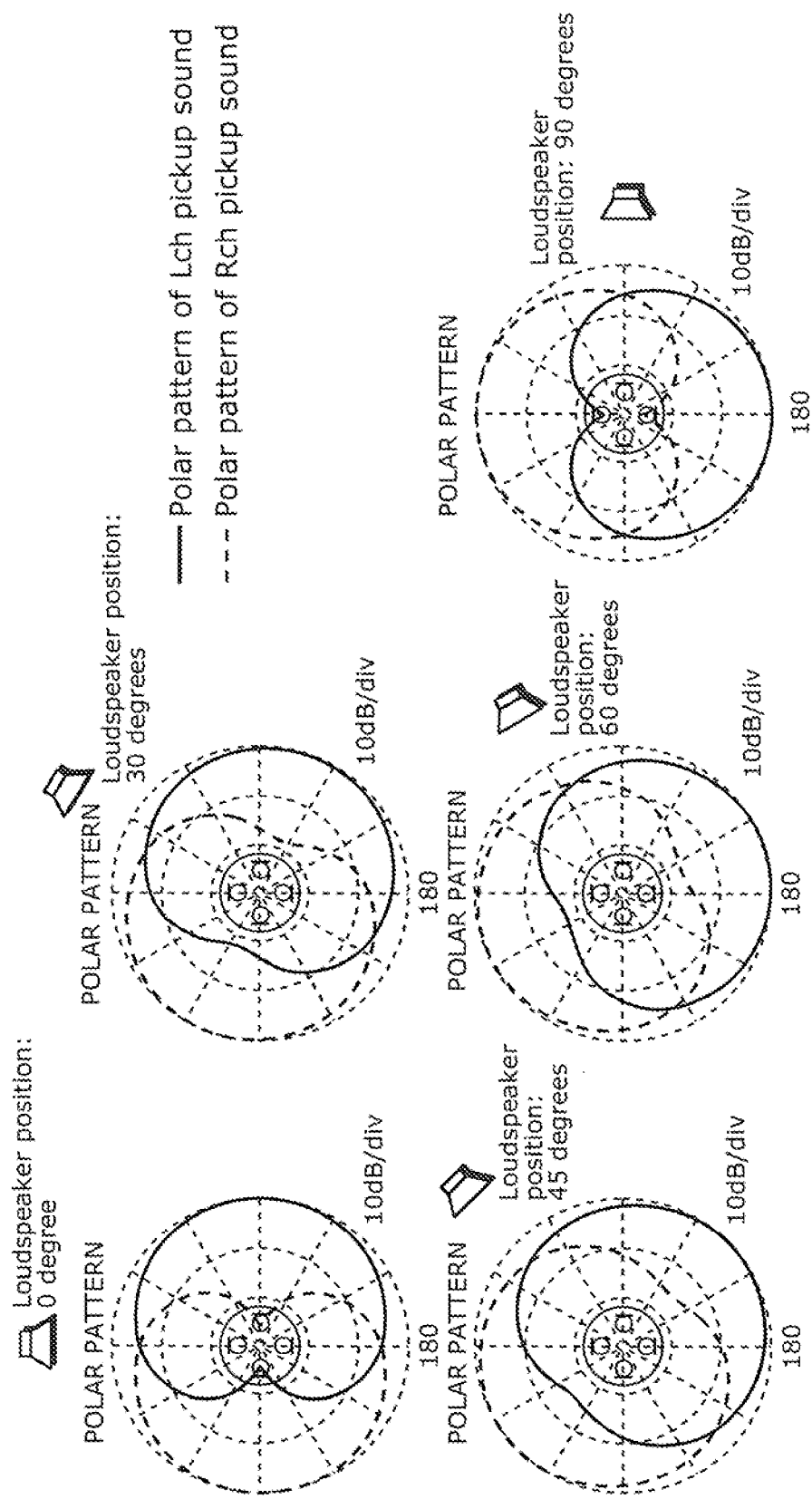
FIG. 4 is a diagram showing an Lch sound pickup polar pattern and a Rch sound pickup polar pattern which are formed by the sound pickup apparatus according to Embodiment 1 of the present invention.

FIG. 4 is a diagram showing Lch sound pickup polar patterns and Rch sound pickup polar patterns which are formed by the sound pickup apparatus 101 according to Embodiment 1 of the present invention. That is to say, FIG. 4 is a diagram showing an example of directivity combined pattern in the case of 4 sound pickup units.

The microphone 110 in the present embodiment includes 2 pairs of sound pickup units with respective main axis directions of directivity being different from each other by 180 degrees. Thus, by mixing the output signals from the sound pickup units (hereinafter referred to as a "unit signal") as shown in FIG. 4, the sound pickup apparatus 101 can pick up sound so that the main axis directions of directivity are different from each other by 180 degrees for any direction.

Respective unit signals $x1(t)$ to $x4(t)$ of the first to fourth sound pickup units 110a to 110d are outputted to a level calculating unit 112 where t indicates a sampling time.

In the present embodiment, each sound pickup unit is a microphone unit having a single directivity, but is not necessarily such a sound pickup unit. For example, each sound pickup unit may be configured with multiple non-directional microphone units, which are installed so as to form a single directivity.

Figure 3:
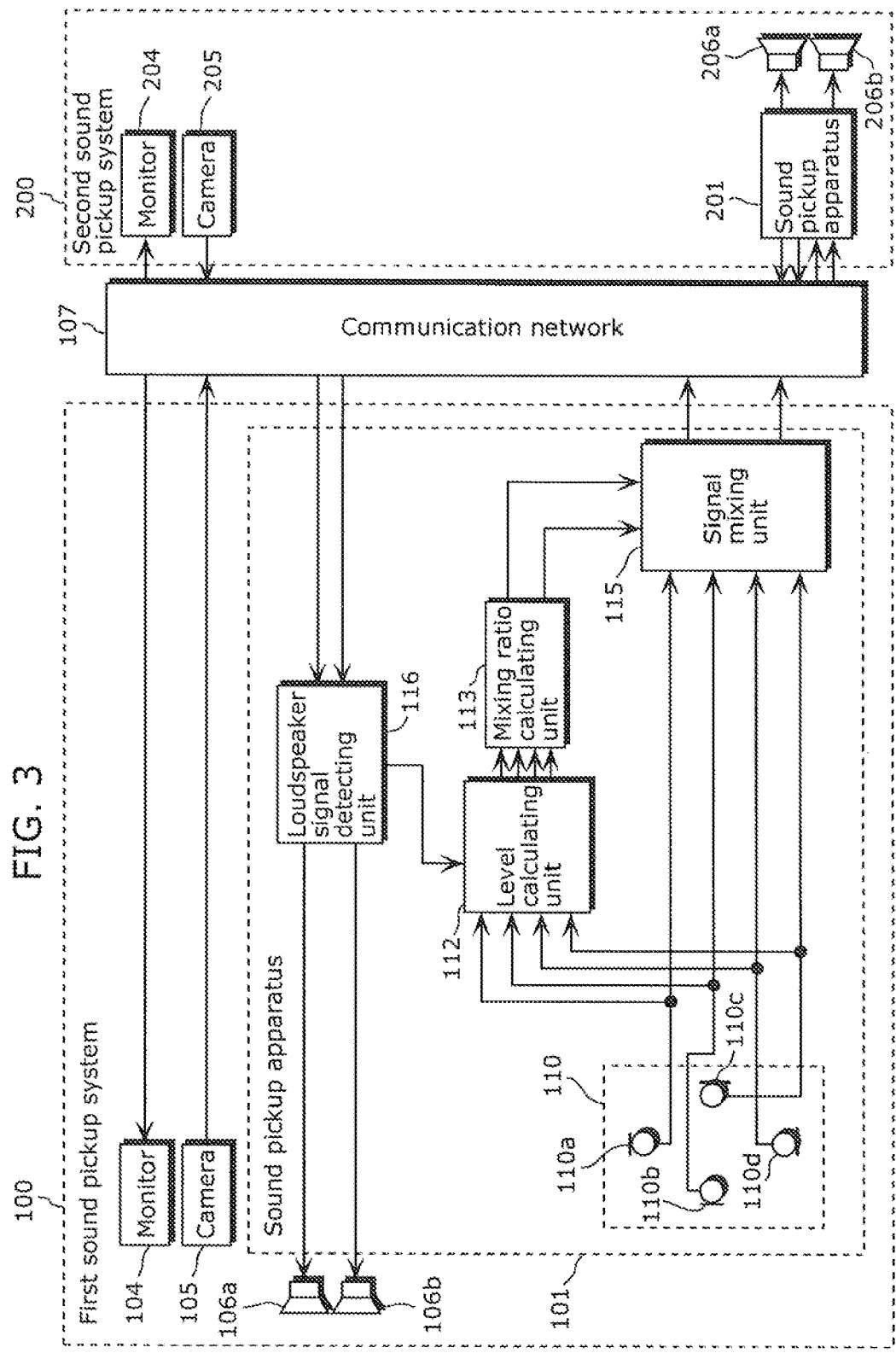
FIG. 3 is a diagram showing the configuration of a video conference system according to Embodiment 1 of the present invention.

Next, the functional configuration of the sound pickup apparatus 101 is described using FIG. 3.

As shown in FIG. 3, the first sound pickup system 100 includes the sound pickup apparatus 101, the monitor 104, the camera 105, the first loudspeaker 106a, and the second loudspeaker 106b. Also, the second loudspeaker 106b contains a sound pickup apparatus 201, a monitor 204, a camera 205, a first loudspeaker 206a, and a second loudspeaker 206b.

The sound pickup apparatus 101 includes microphone 110, the level calculating unit 112, a mixing ratio calculating unit 113, a signal mixing unit 115, and a speaker signal detecting unit 116. The internal configuration of the sound pickup apparatus 201 is similar to that of the sound pickup apparatus 101, thus the figure and description for the sound pickup apparatus 201 are omitted.

The speaker signal detecting unit 116 receives a stereo signal as an input, which is a reception signal transmitted from the second sound pickup system 200 via the communication network 107, and outputs a flag signal flg, which is a determination result for the presence of a reception signal where the reception signal corresponds to a speaker signal for outputting sound from a loudspeaker. In other words, the speaker signal detecting unit 116 determines whether a speaker signal is present or not.

The level calculating unit 112 calculates the signal level of the sound outputted from the first and second loudspeakers 206a, 206b for each output signal of the first to fourth sound pickup units 110a to 110d.

Specifically, the level calculating unit 112 receives respective unit signals $x1(t)$ to $x4(t)$, and a flag signal flg which is a determination result for the presence of a reception signal, then calculates signal power $Px1(t)$ to $Px4(t)$ as signal levels, which are power levels of the respective unit signals $x1(t)$ to $x4(t)$.

Hereinafter, unless otherwise specified, the signal power calculated by the level calculating unit 112 is a time-averaged power. Also, the time interval which is set for calculating a time-averaged power and averaging the levels of picked up sound is assumed to be a short time period.

The flag signal flg is used as a control signal when a signal power is calculated herein. That is to say, the level calculating unit 112 calculates signal power $Px1(t)$ to $Px4(t)$ only in the case where a reception signal is determined to be present (flg=1). That is to say, the level calculating unit 112 calculates signal levels in the case where a speaker signal is determined to be present by the signal detecting unit 116.

The level calculating unit 112 outputs the calculated signal to power $Px1(t)$ to $Px4(t)$ to the mixing ratio calculating unit 113, while holding the signal power. In the case where no reception signal in present (flg=0), the level calculating unit 112 outputs the signal power calculated last time (the most recent signal power being held) to the mixing ratio calculating unit 113.

The mixing ratio calculating unit 113 corresponds to a mixing coefficient calculating unit. The mixing ratio calculating unit 113 calculates mixing coefficients adjusted to the main axis directions of directivity of the first to fourth sound pickup units 110a to 110d by using the signal levels calculated by the level calculating unit 112. In the present embodiment, the mixing ratio calculating unit 113 calculates mixing coefficients so that resulting stereo signal is equivalent to a signal picked up in stereo from two sound pickup directions which are different from each other by 180 degrees.

Specifically, the mixing ratio calculating unit 113 receives signal power $Px1(t)$ to $Px4(t)$ as inputs, and calculates Lch mixing coefficients for Lch reproduction $A11(t)$, $A12(t)$, $A13(t)$, $A14(t)$ and Rch mixing coefficients for Rch reproduction $A21(t)$, $A22(t)$, $A23(t)$, $A24(t)$.

That is to say, in each of the first to fourth sound pickup units 110a to 110d, the mixing ratio calculating unit 113 calculates Lch mixing coefficients by using the signal level of another sound pickup unit located one adjacent side of the relevant sound pickup unit, and calculates Rch mixing coefficients by using the signal level of another sound pickup unit located the other adjacent side of the relevant sound pickup unit. The Lch mixing coefficient and Rch mixing coefficient correspond the first mixing coefficient and the second coefficient, respectively. The details of the mixing coefficients are described later.

The signal mixing unit 115 generates a stereo signal by mixing the output signals from the first to fourth sound pickup units 110a to 110d using the mixing coefficients.

Specifically, the signal mixing unit 115 receives Lch mixing coefficients $A11(t)$ to $A14(t)$, Rch mixing coefficients $A21(t)$ to $A24(t)$, and the sound pickup units $x1(t)$ to $x4(t)$ as inputs. The signal mixing unit 115 then calculates an output signal $y1(t)$ as R channel signal, and an output signal $y2(t)$ as L channel signal.

That is to say, the signal mixing unit 115 generates one part of the stereo signal, i.e., L channel signal by multiplying the output signals of the first to fourth sound pickup units 110a to 110d by respective Lch mixing coefficients and adding the multiplied output signals together. Also, the signal mixing unit 115 generates the other part of the stereo signal, i.e., L channel signal by multiplying the output signals of the first to fourth sound pickup units 110a to 110d by respective Lch mixing coefficients and adding the multiplied output signals together.

The signal mixing unit 115 then transmits the calculated output signal $y1(t)$ to the first loudspeaker 206a included in the second sound pickup system 200, and transmits the calculated output signal $y2(t)$ to the second loudspeaker 206b included in the second sound pickup system 200.

$$\begin{bmatrix} y1(t) \\ y2(t) \end{bmatrix} = \begin{bmatrix} A11(t) & A12(t) & A13(t) & A14(t) \\ A21(t) & A22(t) & A23(t) & A24(t) \end{bmatrix} \begin{bmatrix} x1(t) \\ x2(t) \\ x3(t) \\ x4(t) \end{bmatrix} \quad \text{[Expression 1]}$$

Next, various types of operations of the sound pickup apparatus 101 configured as shown above are described.

Figure 5:
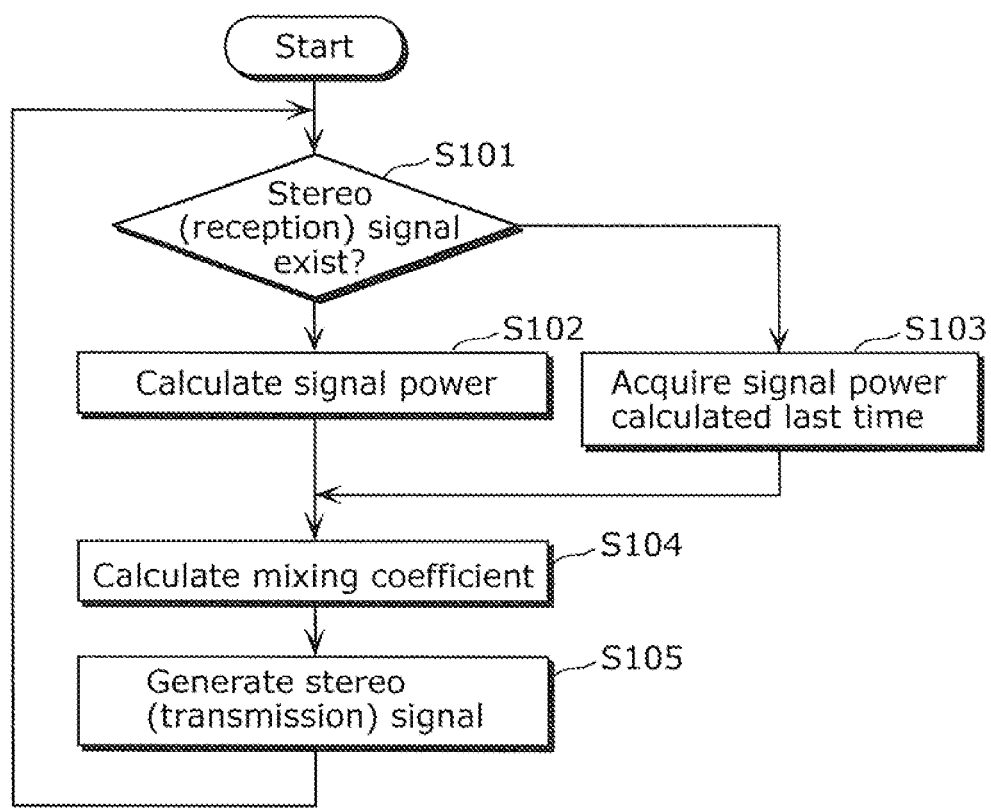
FIG. 5 is a flowchart showing the operation of the sound pickup apparatus according to Embodiment 1 of the present invention.

FIG. 5 is a flowchart showing the operation of the sound pickup apparatus 101 according to Embodiment 1.

First, the speaker signal detecting unit 116 determines whether a stereo signal, which is a reception signal transmitted from the second sound pickup system 200 via the communication network 107, is present or not (S101). In the case where a stereo signal is determined to be present (Yes in S101), the level calculating unit 112 calculates the signal power of outputted signal as a signal level for each output signal from each sound pickup unit, and holds the signal power (S102). On the other hand, in the case where no stereo signal is determined to be present (No in S101), the level calculating unit 112 acquires each signal power calculated last time (S103).

The mixing ratio calculating unit 113 calculates Lch mixing coefficients and Rch mixing coefficients by using each signal power calculated in step S102, and each signal power calculated in step S103 (S104). Subsequently, the signal mixing unit 115 combines the output signals from the sound pickup units by using the calculated Lch mixing coefficients and Rch mixing coefficients so that a stereo signal is generated as a transmission signal (S105), and the flow returns to the process in step S101.

As shown above, the sound pickup apparatus 101 repeats the process from step 101 to step 105.

Next the process of calculating the mixing coefficients (S104), and the process of generating the stereo signal (S105) are described in more detail.

The position and/or direction of the microphone 110 can be changed freely by the speakers 102a, 102b. Accordingly, fixed value setting of the mixing coefficients for the first to fourth sound pickup units 110a to 110d allows no R channel signal and no L channel signal to be generated.

Thus, in the present embodiment, the sound pickup apparatus 101 calculates mixing coefficients adjusted to the main axis direction of directivity of each sound pickup unit by using the voice signals of the communication partner site, which are reproduced from the first and second speakers 106a, 106b.

Supposing that the same voice is reproduced from the first and second speakers 106a, 106b, a sound source can be assumed to be virtually located in the middle between the first speaker 106a and the second speaker 106b. Now, the first and second speakers 106a, 106b are assumed to be a single virtual sound source, and the output signal from the virtual sound source is denoted by voice signal V(t).

The voice signal V(t) of the virtual sound source reaches the first to fourth sound pickup units 110a to 110d through acoustic space. In this situation, the gains depending on the respective main axis directions of directivity of the first to fourth sound pickup units 110a to 110d are denoted by a first to fourth gains D1 to D4, respectively. For the sake of simplicity, it is assumed herein that a voice signal is not attenuated in the acoustic space.

Now, considering that the first to fourth unidirectional sound pickup units 110a to 110d is a microphone unit, the first to fourth gains D1 to D4 in the arrangement of the microphone 110 shown in FIG. 1 are as follows.

That is, the main axis direction of directivity of the first sound pickup unit 110a forms a 0-degree angle with the direction from the microphone 110 to the virtual sound source, thus the first gain D1 can be assumed to be "1." Also, the second and third sound pickup unit 110b, 110c are inclined 90 degrees to the direction from the microphone 110 to the virtual sound source, thus the second and third gains D2, D3 can be assumed to be "0.5." Also, the main axis direction of directivity of the fourth sound pickup unit 110d are inclined 180 degrees to the direction from the microphone 110 to the virtual sound source, thus the fourth gain D4 can be assumed to be "0."

When the output signals X1(t) to X4(t) of the first to fourth sound pickup units 110a to 110d are multiplied by thus obtained first to fourth gains D1 to D4 as the mixing coefficients, respectively, and added together, the resulting signal is a picked up sound with the main axis of directivity being toward the direction of the virtual sound source.

Similarly, in the case of FIG. 2 where the microphone 110 is rotated 45 degrees in a clockwise direction, the main axis directions of the first and second sound pickup unit 110a, 110b are inclined 45 degrees to the direction from the microphone 110 to the virtual sound source, thus the first and second gains D1, D2 can be assumed to be "0.7." Also, the main axis directions of the third and fourth sound pickup unit 110c, 110d are inclined 135 degrees to the direction from the microphone 110 to the virtual sound source, thus the third and fourth gains D3, D4 can be assumed to be "0.2."

When the output signals X1(t) to X4(t) of the first to fourth sound pickup units 110a to 110d are multiplied by thus obtained first to fourth gains D1 to D4 as the mixing coefficients, the resulting signal is a picked up sound with the main axis of directivity being toward the direction of the virtual sound source.

As described above, the first to fourth gains D1 to D4 depending on the respective main axis directions of directivity of the first to fourth sound pickup units 110a to 110d are uniquely determined by the arrangement of the microphone 110. Multiplying the output signals X1(t) to X4(t) of the first to fourth sound pickup units 110a to 110d by thus determined respective first to fourth gains D1 to D4 as the mixing coefficients generates a picked up sound with the main axis of directivity being toward the direction of the virtual sound source.

For this reason, by using the first to fourth gains D1 to D4 as the coefficients for the outputs from the sound pickup units on the adjacent right, a picked up sound with the main axis of directivity being inclined 90 degrees to the right of the virtual sound source can be generated. Conversely, by using the first to fourth gains D1 to D4 as the coefficients for the outputs from the sound pickup units on the adjacent left, a picked up sound with the main axis of directivity being inclined 90 degrees to the left of the virtual sound source can be generated.

By using this technique, sound separated on the left and right sides of the sound source can be picked up. That is to say, based on the first to fourth gains D1 to D4, the Lch mixing coefficients A11(t) to A14(t) and the Rch mixing coefficients A21(t) to A24(t) can be calculated. Specifically, the Lch mixing coefficients A11(t) to A14(t) and the Rch mixing coefficients A21(t) to A24(t) can be expressed as in Expression (2) by using the first to fourth gains D1 to D4.

$$\begin{bmatrix} A11(t) \\ A12(t) \\ A13(t) \\ A14(t) \end{bmatrix} = \begin{bmatrix} A24(t) \\ A23(t) \\ A22(t) \\ A21(t) \end{bmatrix} = \begin{bmatrix} D2 \\ D4 \\ D1 \\ D4 \end{bmatrix} \quad \text{[Expression 2]}$$

However, how the microphone 110 is installed is unknown, thus the first to fourth gains D1 to D4 cannot be directly determined. Thus the mixing ratio calculating unit 113 calculates the mixing coefficients by using the signal power Px1(t) to Px4(t) of the first to fourth sound pickup units 110a to 110d.

Supposing that the signal power of the voice signal V(t) of the first and second loudspeakers 106a, 106b is Pv(t), the signal power Px1(t) to Px4(t) of the first to fourth sound pickup units 110a to 110d can be expressed as in Expression 3.

$$\begin{bmatrix} Px1(t) \\ Px2(t) \\ Px3(t) \\ Ax4(t) \end{bmatrix} = \begin{bmatrix} D1 \\ D2 \\ D3 \\ D4 \end{bmatrix} Pv(t) \quad \text{[Expression 3]}$$

Transforming Expression 3 to solve for the first to fourth gains D1 to D4 gives Expression 4.

$$\begin{bmatrix} D1 \\ D2 \\ D3 \\ D4 \end{bmatrix} = \begin{bmatrix} Px1(t) \\ Px2(t) \\ Px3(t) \\ Ax4(t) \end{bmatrix} \Big/ Pv(t) \qquad \text{[Expression 4]}$$

Here, the total signal power of all the sound pickup units is denoted by Px(t) (=Px1(t)+Px2(t)+Px3(t)+Px4(t)). Px(t) can be considered to be the sum of combined signal power of two unidirectional microphones whose main axis directions of directivity are different from each other by 180 degrees (Px(t)={Px1(t)+Px4(t)}+{Px2(t)+Px3(t)}).

The directional characteristic of an unidirectional microphone is expressed by (1+cos θ)/2. Therefore, when two unidirectional microphones whose main axis directions of directivity are different from each other by 180 degrees are combined, the directional characteristic is (1+cos θ)/2+(1+cos(θ+180°)/2=1, which indicates non-directional.

That is to say, Px(t) can be considered to be the sum of signal power of two non-directional microphones. Accordingly, when voice is amplified from a loudspeaker and no sound other than the speaker amplified voice is present, Pv(t)=Px(t)/2 as shown in Expression (5).

$$\begin{bmatrix} D1 \\ D2 \\ D3 \\ D4 \end{bmatrix} = \begin{bmatrix} Px1(t) \\ Px2(t) \\ Px3(t) \\ Ax4(t) \end{bmatrix} \Big/ Pv(t) = 2 \begin{bmatrix} Px1(t) \\ Px2(t) \\ Px3(t) \\ Ax4(t) \end{bmatrix} \Big/ Px(t) \qquad \text{[Expression 5]}$$

From Expression (2) and Expression (5), the mixing ratio calculating unit 113 calculates the Lch mixing coefficient A11(t) and the Rch mixing coefficients A21(t) to A24(t) as in Expression (6) by using the signal power Px1(t) to Px4(t) of the sound pickup units. That is to say, the mixing ratio calculating unit 113 calculates the mixing coefficients adjusted to the main axis direction of directivity of each sound pickup unit by using the signal levels.

$$\begin{bmatrix} A11(t) \\ A12(t) \\ A13(t) \\ A14(t) \end{bmatrix} = \begin{bmatrix} A24(t) \\ A23(t) \\ A22(t) \\ A21(t) \end{bmatrix} = 2 \begin{bmatrix} Px2(t) \\ Px4(t) \\ Px1(t) \\ Px3(t) \end{bmatrix} \Big/ Px(t) \qquad \text{[Expression 6]}$$

FIG. 4 shows polar patterns of directivity which are formed when a stereo signal is generated by using the Lch mixing coefficients A11(t) to A14(t) and the Rch mixing coefficients A21(t) to A24(t) in this manner.

The signal power Px1(t) to Px4(t) of the first to fourth sound pickup units 110a to 110d are normalized with respect to the total value Px(t) in Expression (4), but may be approximated by values which are normalized using the maximum values of the signal power Px1(t) to Px4(t). That is to say, the mixing ratio calculating unit 113 may calculate the mixing coefficients adjusted to the main axis direction of directivity of each sound pickup unit using the signal levels.

As described above, according to the sound pickup apparatus 101 in the present embodiment, the mixing coefficients adjusted to the main axis direction of directivity can be calculated by using the signal levels of the sound outputted from the loudspeakers. Therefore, sound from a sound source can be picked up clearly in stereo without measuring the positions of the microphones.

Also, the microphone 110 includes the first to fourth sound pickup units 110a to 110d which are arranged to have main axis directions of directivity separated by 90 degrees. Accordingly, sound from a sound source located in the periphery of the microphone 110 can be clearly picked up in stereo regardless of the orientation of the installed microphone 110. That is to say, the speakers can freely install the microphone 110.

Embodiment 2

Next, a sound pickup apparatus according to Embodiment 2 of the present invention is described with reference to FIG. 6.

Figure 6:
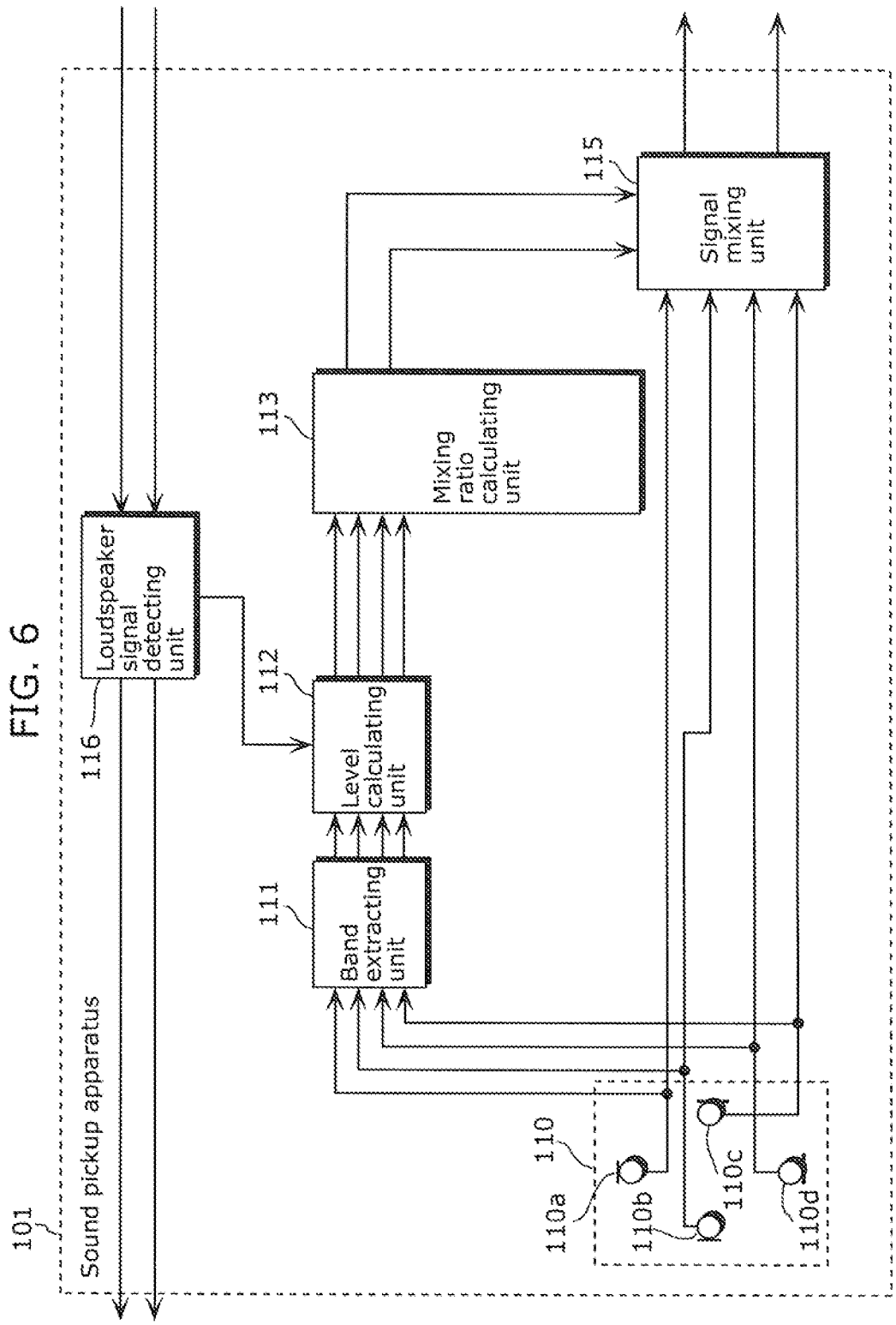
FIG. 6 is a block diagram showing the functional configuration of a sound pickup apparatus according to Embodiment 2 of the present invention.

FIG. 6 is a block diagram showing the functional configuration of the sound pickup apparatus 101 according to Embodiment 2 of the present invention. The sound pickup apparatus 101 shown in FIG. 6 is installed to replace the sound pickup apparatus 101 according to Embodiment 1 shown in FIG. 3.

Also, the sound pickup apparatus 101 according to the present embodiment differs from the sound pickup apparatus 101 according to Embodiment 1 shown in FIG. 3 only in that a band extracting unit 111 is newly added. In the following, points of difference between the present embodiment and Embodiment 1 are mainly described.

The band extracting unit 111 extracts only those signals in a predetermined frequency band from the output signals of the first to fourth sound pickup units 110a to 110d, and outputs the signals to the level calculating unit 112.

The predetermined frequency band is, for example, the voice band of the speakers 102a, 102b (300 Hz to 7 kHz). More preferably, the predetermined frequency band is a band within the voice band, which has a relatively small influence of room noise (for example, 1 kHz to 4 kHz). By this extraction of signal, the sound pickup apparatus 101 can suppress the influence of noise such as the sound other than the sound outputted from the loudspeakers as the mixing coefficients are calculated by using the voice of the speakers outputted from the loudspeakers. That is to say, the sound pickup apparatus 101 can calculate the mixing coefficients with a higher accuracy.

Also, the predetermined frequency band may be a band which is determined by taking, for example, directional characteristic of each of the first to fourth sound pickup units 110a to 110d (frequency characteristic of directivity) into consideration. Specifically, the predetermined frequency band may be a band, in which the directivity, for all the sound pickup units can be stably obtained.

By extracting the signals in such predetermined frequency band, the influence of noise other than the voice of the speakers 102a, 102b on the signal levels inputted to the mixing ratio calculating unit 113 can be reduced.

As described above, according to the present embodiment, the influence of noise other than the voice of the speakers 102a, 102b, included in the sound pickup units' signals inputted to the mixing ratio calculating unit 113 can be reduced. Thereby, accuracy of the mixing coefficients calculated by the mixing ratio calculating unit 113 is increased, and stereo signals for allowing clearer sound to be reproduced can be generated.

Embodiment 3

Next, a sound pickup apparatus according to Embodiment 3 of the present invention is described with reference to FIGS. 7 and 8.

Figure 7:
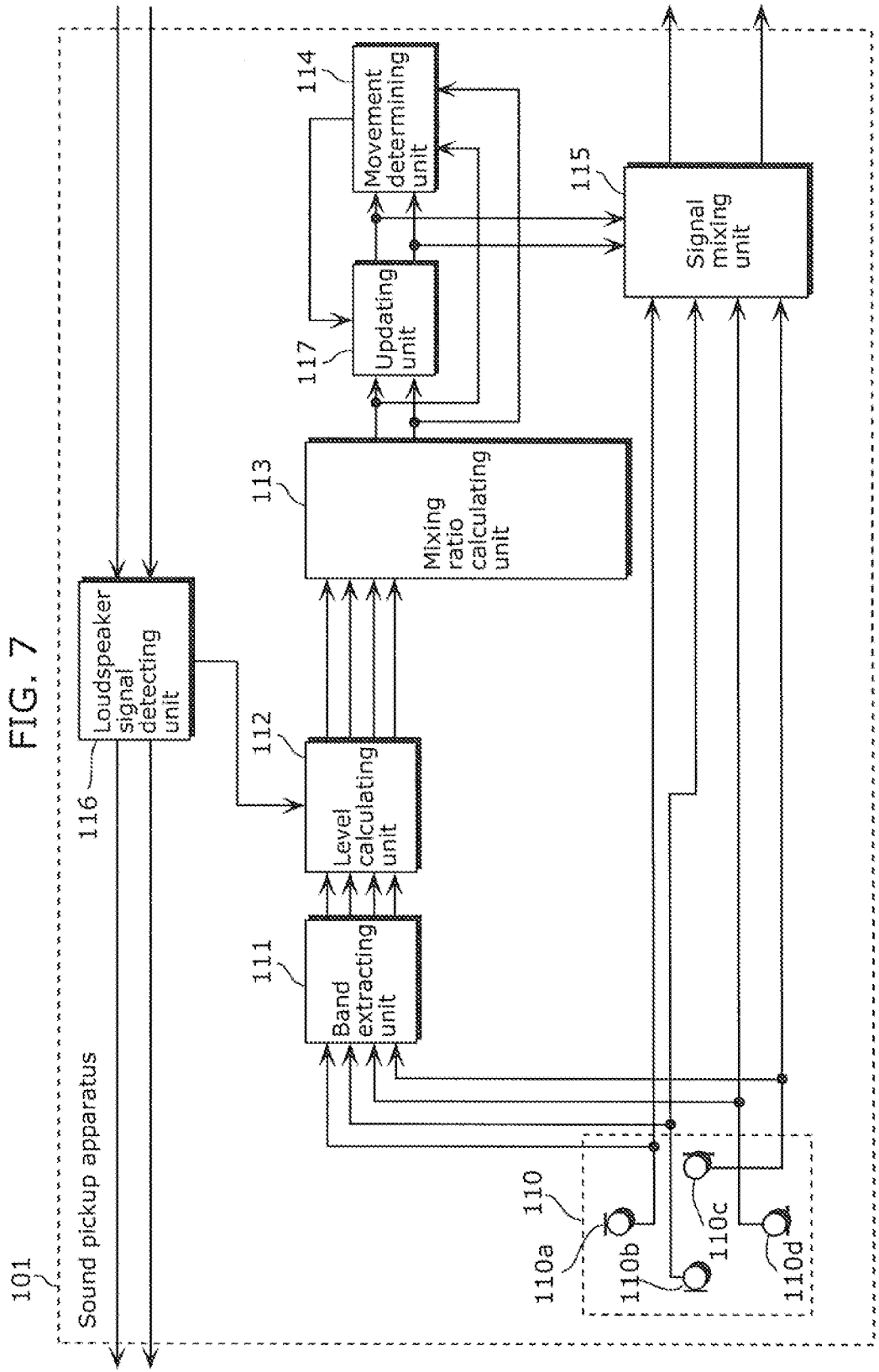
FIG. 7 is a block diagram showing the functional configuration of a sound pickup apparatus according to Embodiment 3 of the present invention.

FIG. 7 is a block diagram showing the functional configuration of the sound pickup apparatus 101 according to Embodiment 3 of the present invention. The sound pickup apparatus 101 shown in FIG. 7 is installed to replace the sound pickup apparatus 101 according to Embodiment 1 or 2 shown in FIG. 3 or 6.

Also, the sound pickup apparatus 101 according to the present embodiment differs from the sound pickup apparatus 101 according to Embodiment 2 shown in FIG. 6 only in that an updating unit 117 and a movement determining unit 114 are newly added. In the following, points of difference between the present embodiment and Embodiment 1 or 2 are mainly described.

The microphone 110 may be easily rotated or moved by the speakers 102a, 102b. In the case where the microphone 110 is rotated or moved, generation of a stereo signal using the mixing coefficients calculated before the rotation or movement of the microphone 110 causes a mismatch between an image and its sound image. For this reason, the mixing coefficients need to be calculated again after the movement.

In the case where the mixing coefficients are calculated correctly, and the microphone 110 is not rotated or moved, it is preferable that already calculated mixing coefficients are not updated or their update frequency is controlled to be lowered so that the sound images are not changed.

Now, in the present embodiment, the movement determining unit 114 determines whether the microphone is moved or not. Specifically, the movement determining unit 114 determines whether the microphone 110 is moved or not based on the rate of change of the mixing coefficients calculated by the mixing ratio calculating unit 113.

The updating unit 117 then outputs Lch smoothing mixing coefficients $B11(t)$ to $B14(t)$ and Rch smoothing mixing $B21(t)$ to $B24(t)$ by averaging the Lch mixing coefficients $A11(t)$ to $A14(t)$ and the Rch mixing coefficients $A21(t)$ to $A24(t)$ over time.

Further, the updating unit 117 adjusts the frequency of calculation of the Lch smoothing mixing coefficients $B11(t)$ to $B14(t)$ and the Rch smoothing mixing coefficients $B21(t)$ to $B24(t)$ based on the determination result by the movement determining unit 114. That is to say, the updating unit 117 sets a higher frequency of calculation of the smoothing mixing coefficients for the case where the microphone 110 is determined to be moved than for the case where the microphone 110 is determined to be still.

Consequently, the sound pickup apparatus 101 can improve update responsiveness of the mixing coefficients to the movement of the microphone 110, while increasing the stability of the mixing coefficients.

Figure 8:
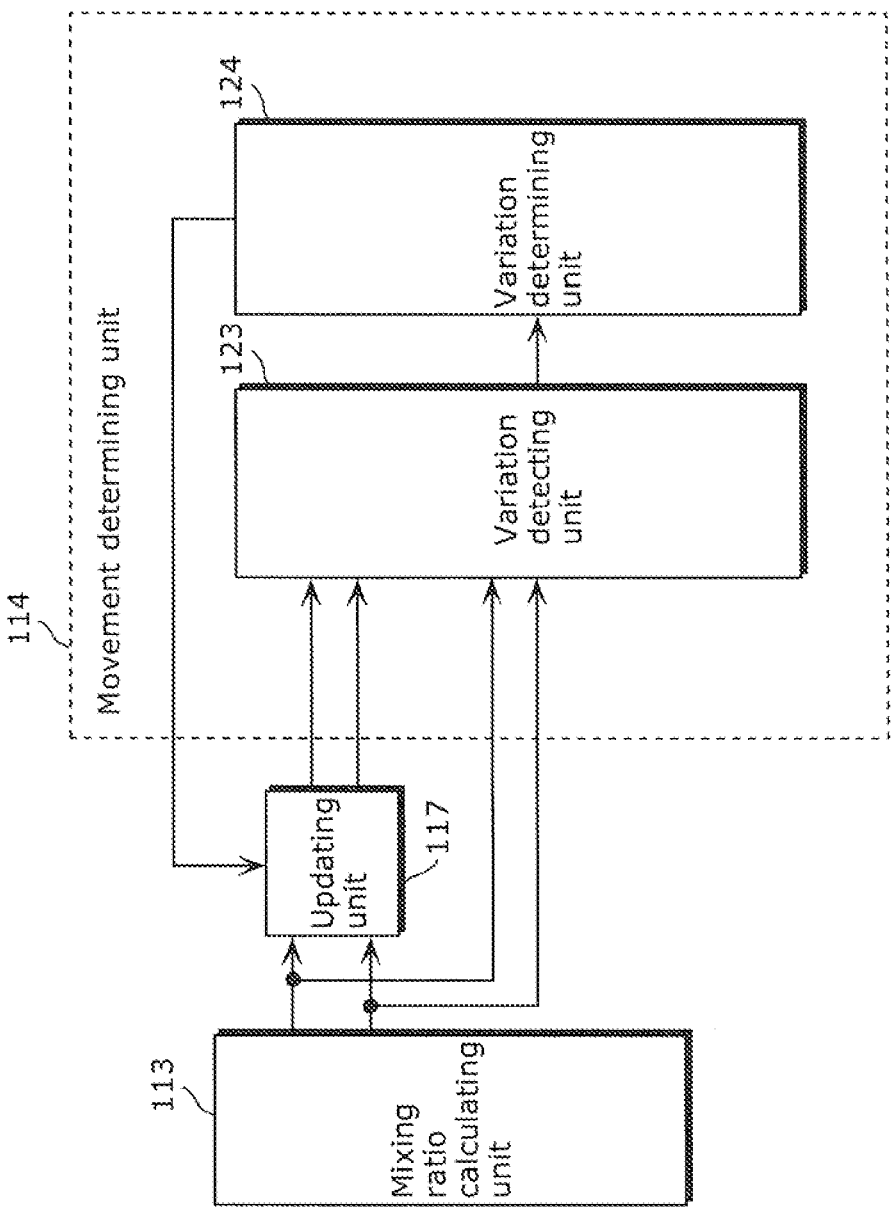
FIG. 8 is a block diagram showing the functional configuration in detail of a movement determining unit according to Embodiment 3 of the present invention.

Next, the detail of the movement determining unit 114 is described using FIG. 8.

FIG. 8 is a block diagram showing the functional configuration in detail of the movement determining unit 114 according to Embodiment 3 of the present invention. As shown in FIG. 8, the movement determining unit 114 includes a variation detecting unit 123, and a variation determining unit 124.

The variation detecting unit 123 receives, as inputs, the Lch mixing coefficients $A11(t)$ to $A14(t)$ and the Rch mixing coefficients $A21(t)$ to $A24(t)$ calculated by the mixing ratio calculating unit 113, and the Lch smoothing mixing coefficients $B11(t)$ to $B14(t)$ and the Rch smoothing mixing coefficients $B21(t)$ to $B24(t)$ calculated by the updating unit 117, then detects a variation indicating a rate of change of the mixing coefficients as shown in Expression (7).

$$\text{mic\_var} = \sum_k |B_{t-1}(k) - A_t(k)| \qquad \text{[Expression 7]}$$

Where $B_{t-1}$ and $A_t$ are expressed by Expression (8).

$$B_{t-1} = [B11(t-1)B12(t-1)B13(t-1)B14(t-1)B14(t-1) \\ B21(t-1)B22(t-1)B23(t-1)B24(t-1)]$$

$$A_t = [A11(t)A12(t)A13(t)A14(t)A21(t)A22(t)A23(t)A24(t)] \qquad \text{[Expression 8]}$$

While the microphone 110 is still, the mixing coefficient $A_t$ and the smoothing mixing coefficient $B_{t-1}$ have almost same value, thus the value of variation mic_var is reduced. On the other hand, when the microphone 110 is moved, the value of the mixing coefficient $A_t$ is changed first. Accordingly, the difference between the mixing coefficient $A_t$ and the smoothing mixing coefficient $B_{t-1}$ is increased. Therefore, the value of the variation mic_var is increased.

Now, the variation determining unit 124 monitors the value of the variation mic_var. Then in the case where the variation mic_var exceeds a threshold value, the variation determining unit 124 determines that the microphone 110 is moved, and sets move_flg=1. On the other hand, in the case where the variation mic_var does not exceed a threshold value, the variation determining unit 124 determines that the microphone 110 is not moved, and sets move_flg=0.

According to the value of move_flg set in this manner, the updating unit 117 adjusts the frequency of calculation of the smoothing mixing coefficients.

As described above, according to the sound pickup apparatus 101 in the present embodiment, update responsiveness of the sound image localization can be improved when the microphone 110 is moved. Also, while the microphone 110 is still, stability of the sound image localization can be secured. In other words, according to the sound pickup apparatus 101 in the present embodiment, update responsiveness of the mixing coefficients to the movement of the microphone 110 can be improved, while the stability of the mixing coefficients also can be increased. Thus, sound from a sound source located in the periphery of the microphone 110 can be picked up in stereo more clearly.

Also, the movement determining unit 114 can determine whether the microphone 110 is moved or not based on the rate of change of the mixing coefficients, and a movement sensor or the like does not need to be installed, thus whether the microphone 110 is moved or not can be easily determined with a simple configuration.

The movement determining unit 114 does not necessarily need to determine whether the microphone 110 is moved or not based on a rate of change of the mixing coefficients. For example, the movement determining unit 114 may determine whether the microphone 110 is moved or not based on sensor signals from a movement sensor such as a gyro sensor attached to the microphone 110. In this case, the sound pickup apparatus has more complex configuration than that of the sound pickup apparatus 101 of the present embodiment, however, update responsiveness of the mixing coefficients to the movement of the microphone 110 can be improved, while the stability of the mixing coefficients can be increased.

Also, in the present embodiment, the movement determining unit 114 determines whether the microphone 110 is moved or not by using the mixing coefficients and the smoothing mixing coefficients for both Lch and Rch, but may use the mixing coefficients and the smoothing mixing coefficients for either one channel to determine whether the microphone 110 is moved or not.

Considering that the main axis directions of directivity formed by Lch and Rch are different from each other by 180 degrees, the updating unit 117 may use the smoothing mixing coefficients for either one channel to calculate the smoothing mixing coefficients for the other channel.

$$\begin{bmatrix} B11(t) \\ B12(t) \\ B13(t) \\ B14(t) \end{bmatrix} = \begin{bmatrix} B24(t) \\ B23(t) \\ B22(t) \\ B21(t) \end{bmatrix}$$ [Expression 9]

Also, in the present embodiment, the sound pickup apparatus 101 includes the updating unit 117, but does not necessarily need to include the updating unit 117. In this case, the mixing ratio calculating unit 113 may set a higher frequency of calculation of the mixing coefficients for the case where the microphone 110 is determined to be moved than for the case where the microphone 110 is determined to be still. Thereby, the sound pickup apparatus 101 can improve update responsiveness of the mixing coefficients to the movement of the microphone 110, while increasing the stability of the mixing coefficients.

Embodiment 4

Next, a sound pickup apparatus according to Embodiment 4 of the present invention is described with reference to FIG. 9A.

Figure 9A:
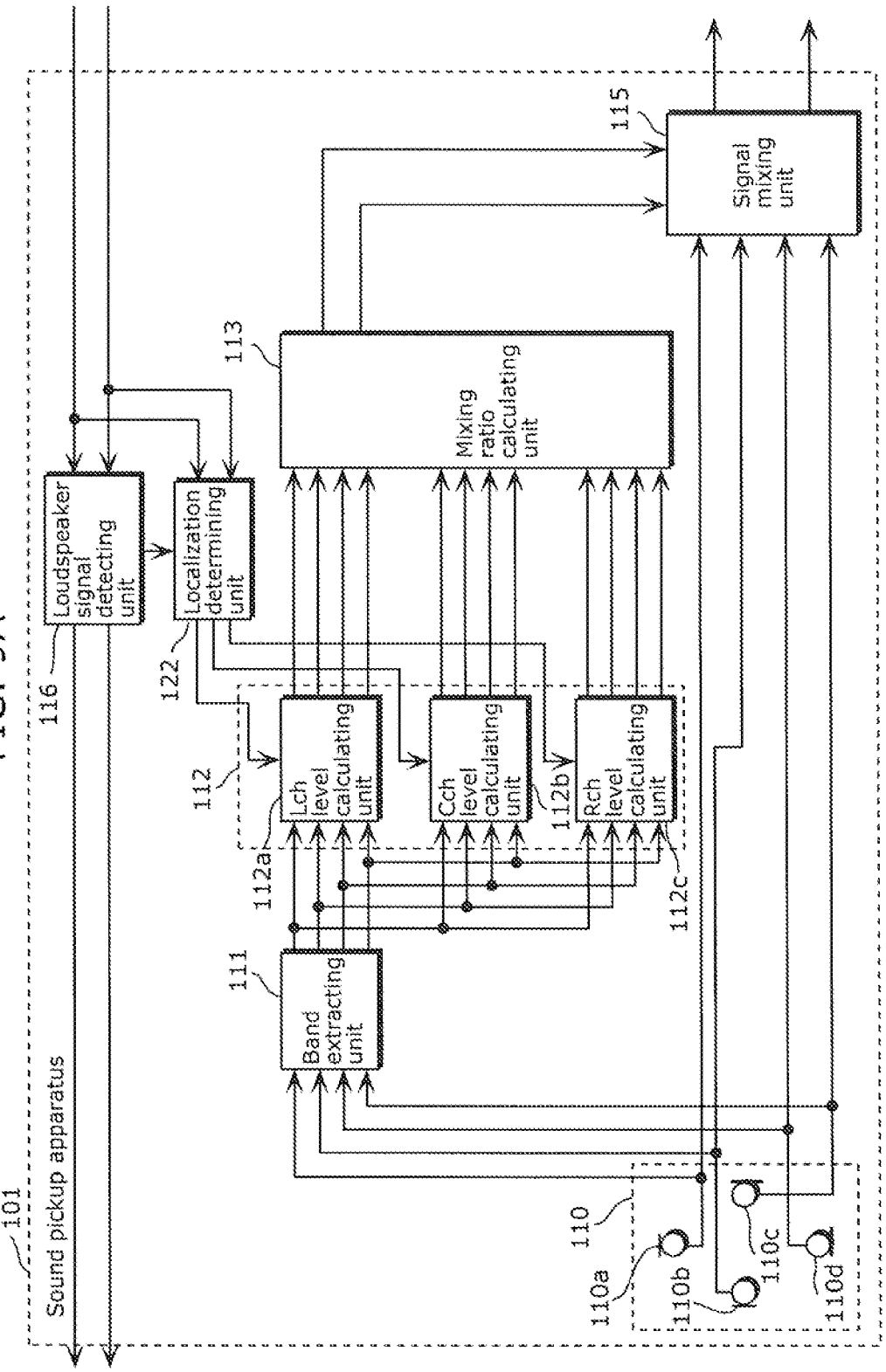
FIG. 9A is a block diagram showing the functional configuration of a sound pickup apparatus according to Embodiment 4 of the present invention.

FIG. 9A is a block diagram showing the functional configuration of the sound pickup apparatus 101 according to Embodiment 4 of the present invention. The sound pickup apparatus 101 shown in FIG. 9A is installed to replace the sound pickup apparatus 101 according to Embodiment 1, 2, or 3 shown in FIG. 3, 6, or 7.

Also, the sound pickup apparatus 101 according to the present embodiment differs from the sound pickup apparatus 101 according to Embodiment 2 shown in FIG. 6 only in that a localization determining unit 122 is newly added, and the level calculating unit 112 includes an Lch level calculating unit 112a, a Cch level calculating unit 112b, and a Rch level calculating unit 112c. In the following, points of difference between the present embodiment and Embodiments 1 to 3 are mainly described.

The voice signals reproduced from the first and second loudspeakers 106a, 106b are stereo signals. Accordingly, a level difference is generated in the voice signals reproduced from the first and second loudspeakers 106a, 106b. Consequently, the sound image localized positions for the following cases are different: the case where the reproduced sound from the first loudspeaker 106a is greater than that from the second loudspeaker 106b (the case where the sound image is localized to the left); the case where the reproduced sound from the first loudspeaker 106a is the same as that from the second loudspeaker 106b (the case where the sound image is localized to the center); and the case where the reproduced sound from the second loudspeaker 106b is greater than that from the first loudspeaker 106a (the case where the sound image is localized to the right).

Accordingly, even when the first to fourth sound pickup units 110a to 110d are fixed, the first to fourth gains D1 to D4 depending on the respective main axis directions of directivity are changed by the sound image localized positions. That is to say, every time a sound image localized position is changed, the mixing coefficients calculated by the mixing ratio calculating unit 113 are varied and unstable.

Now in the present embodiment, the sound pickup apparatus 101 achieves a state in which the mixing coefficients can be calculated in a stable manner even when the sound image localized position of the sound outputted from a loudspeaker is changed. In the following, the components of such sound pickup apparatus 101 are described.

The localization determining unit 122 determines the sound image localized position from loudspeaker signals for outputting sound from a loudspeaker. In the present embodiment, the localization determining unit 122 determines one of left localization, right localization, and center localization, as a sound image localized position, each localization indicating a relative positional relationship between a sound image localized position and a loudspeaker.

Specifically, in the case where the sound image localized position of the sound reproduced from the first and second loudspeakers 106a, 106b is on the left side as viewed from the speakers 102a, 102b (on the right side as viewed from the first and second loudspeakers 106a, 106b), the localization determining unit 122 determines the sound image localized position to be Lch localized (left localized), and sets dir_flg=0. Also, in the case where the sound image localized position is on the center as viewed from the speakers 102a, 102b (on the center as viewed from the first and second loudspeakers 106a, 106b), the localization determining unit 122 determines the sound image localized position to be Cch localized (center localized), and sets dir_flg=1. Also, in the case where the sound image localized position is on the right side as viewed from the speakers 102a, 102b (on the left side as viewed from the first and second loudspeakers 106a, 106b), the localization determining unit 122 determines the sound image localized position to be Rch localized (right localized), and sets dir_flg=2.

More specifically, in the case where the signal level of the Lch loudspeaker signal exceeds that of the Rch loudspeaker signal by a threshold value or more, for example, the localization determining unit 122 determines the sound image localized position to be Lch localized. Also, in the case where the signal level of the Rch loudspeaker signal exceeds that of the Lch loudspeaker signal by a threshold value or more, for example, the localization determining unit 122 determines the sound image localized position to be Rch localized. Also, in the case where the difference between the signal level of the Rch loudspeaker signal and that of the Lch loudspeaker signal is less than a threshold value, for example, the localization determining unit 122 determines the sound image localized position to be Cch localized.

The level calculating unit 112 calculates a signal level according to the determination result dir_flg of the sound image localized position of the sound. That is to say, according to the sound image localized position determined by the localization determining unit 122, one of the Lch level calculating unit 112a, the Cch level calculating unit 112b and the Rch level calculating unit 112c calculates a signal level.

Specifically, in the case where the sound image localized position is determined to be Lch localized, only the Lch level calculating unit 112a updates the signal power. In the case where the sound image localized position is determined to be Cch localized, only the Cch level calculating unit 112b updates the signal power. In the case where the sound image localized position is determined to be Rch localized, only the Rch level calculating unit 112c updates the signal power.

The mixing ratio calculating unit 113 calculates the mixing coefficients for each sound image localized position determined by the localization determining unit 122.

Specifically, the mixing ratio calculating unit 113 calculates Lch mixing coefficients A11a(t) to A14a(t) and Rch mixing coefficients A21a(t) to A24a(t) in Lch localization by using Expression (6) based on each signal power calculated by the Lch level calculating unit 112a. Similarly, the mixing ratio calculating unit 113 calculates Lch mixing coefficients A11b(t) to A14b(t) and Rch mixing coefficients A21b(t) to A24b(t) in Cch localization by using Expression (6) based on each signal power calculated by the Cch level calculating unit 112b. Similarly, the mixing ratio calculating unit 113 calculates Rch mixing coefficients A11c(t) to A14c(t) and Lch mixing coefficients A21b(t) to A24b(t) in Rch localization by using Expression (6) based on each signal power calculated by the Rch level calculating unit 112c.

The mixing ratio calculating unit 113 then calculates the Lch mixing coefficients A11(t) to A14(t) and the Rch mixing coefficients A21(t) to A24(t) by determining the average of the Lch mixing coefficients, and the average of the Rch mixing coefficients in Lch localization, Cch localization, and Rch localization as shown in Expression (10).

That is to say, the signal mixing unit 115 combines the output signals of the first to fourth sound pickup units 110a to 110d by using the average of the mixing coefficients for each sound image localized position.

$$\begin{bmatrix} A11(t) \\ A12(t) \\ A13(t) \\ A14(t) \end{bmatrix} = \begin{bmatrix} A11a(t) + A11b(t) + A11c(t) \\ A12a(t) + A12b(t) + A12c(t) \\ A13a(t) + A13b(t) + A13c(t) \\ A14a(t) + A14b(t) + A14c(t) \end{bmatrix} \Big/ 3 \qquad \text{[Expression 10]}$$

$$\begin{bmatrix} A21(t) \\ A22(t) \\ A23(t) \\ A24(t) \end{bmatrix} = \begin{bmatrix} A21a(t) + A21b(t) + A21c(t) \\ A22a(t) + A22b(t) + A22c(t) \\ A23a(t) + A23b(t) + A23c(t) \\ A24a(t) + A24b(t) + A24c(t) \end{bmatrix} \Big/ 3$$

Alternatively, the mixing ratio calculating unit 113 may calculate the mixing coefficient for one of Lch and Rch, and uses the calculation result to calculate the mixing coefficient for the other based on the relationship in Expression (2).

As described above, according to the sound pickup apparatus 101 in the present embodiment, variation in the mixing coefficient due to a change of the sound image localized position of the reproduced sound of the first and second loudspeakers 106a, 106b can be suppressed, thus sound can be picked up in stereo in a stable manner.

Although the level calculating unit 112 according to the present embodiment includes the Lch level calculating unit 112a, the Cch level calculating unit 112b, and the Rch level calculating unit 112c, the level calculating unit 112 does not necessarily need to include these calculating units. For example, as shown in FIG. 9B, the sound pickup apparatus 101 may include the level calculating unit 112 as in Embodiment 1. In this case, the mixing ratio calculating unit 113 may calculate the mixing coefficients for each sound image localized position based on the determination result by the localization determining unit 122. Thereby, even with the sound pickup apparatus 101 shown in FIG. 9B, effects similar to those of the sound pickup apparatus 101 shown in FIG. 9A can be achieved.

Embodiment 5

Next, a sound pickup apparatus according to Embodiment 5 of the present invention is described with reference to FIGS. 10 to 12.

Figure 10:
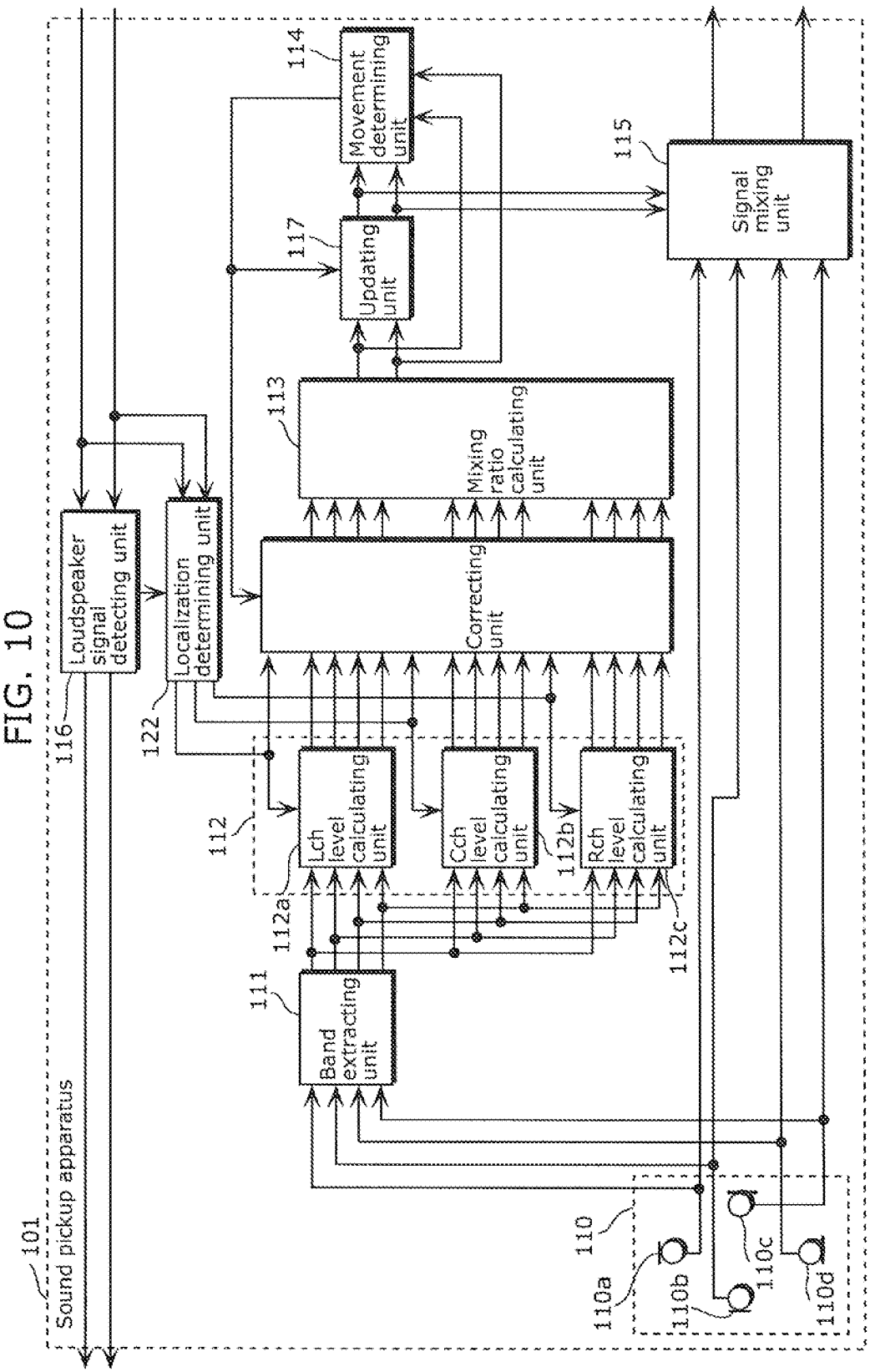
FIG. 10 is a block diagram showing the functional configuration of a sound pickup apparatus according to Embodiment 5 of the present invention.

FIG. 10 is a block diagram showing the functional configuration of the sound pickup apparatus 101 according to Embodiment 5 of the present invention. The sound pickup apparatus 101 shown in FIG. 10 is installed to replace the sound pickup apparatus 101 shown in e.g., FIG. 3.

Also, the sound pickup apparatus 101 shown in FIG. 10 differs from the sound pickup apparatus 101 shown in FIG. 9A only in that an updating unit 117 and a movement determining unit 114, and a correcting unit 121 are newly added. The movement determining unit 114 is similar to the movement determining unit described in Embodiment 3, thus detailed description is omitted. In the following, points of difference between the present embodiment and Embodiments 1 to 4 are mainly described.

In the Lch level calculating unit 112a, the Cch level calculating unit 112b, and the Rch level calculating unit 112c, whether signal power is calculated or not is determined according to the determination result by the localization determining unit 122. Accordingly, in the case where the microphone 110 is moved, signal power may not be calculated for a while in one or two of the Lch level calculating unit 112a, the Cch level calculating unit 112b, and the Rch level calculating unit 112c. As a result, some coefficients in Expression (10) may coincide, for a while, with the coefficients calculated before the microphone 110 is moved.

In the case where the mixing ratio calculating unit 113 calculates mixing coefficients according to Expression (10) in such a situation, the directivity before the movement of the microphone 110 and the directivity after the movement are combined, thus correct directivity cannot be formed.

Now, the correcting unit 121 corrects the signal power based on the determination result by the movement determining unit 114 as well as the determination result by the localization determining unit 122. Specifically, in the case where the microphone 110 is determined to be moved, the correcting unit 121 corrects the signal power which has not been updated after the determination. At this point, the correcting unit 121 does not correct the signal power which has already been updated after the determination.

Figure 11:
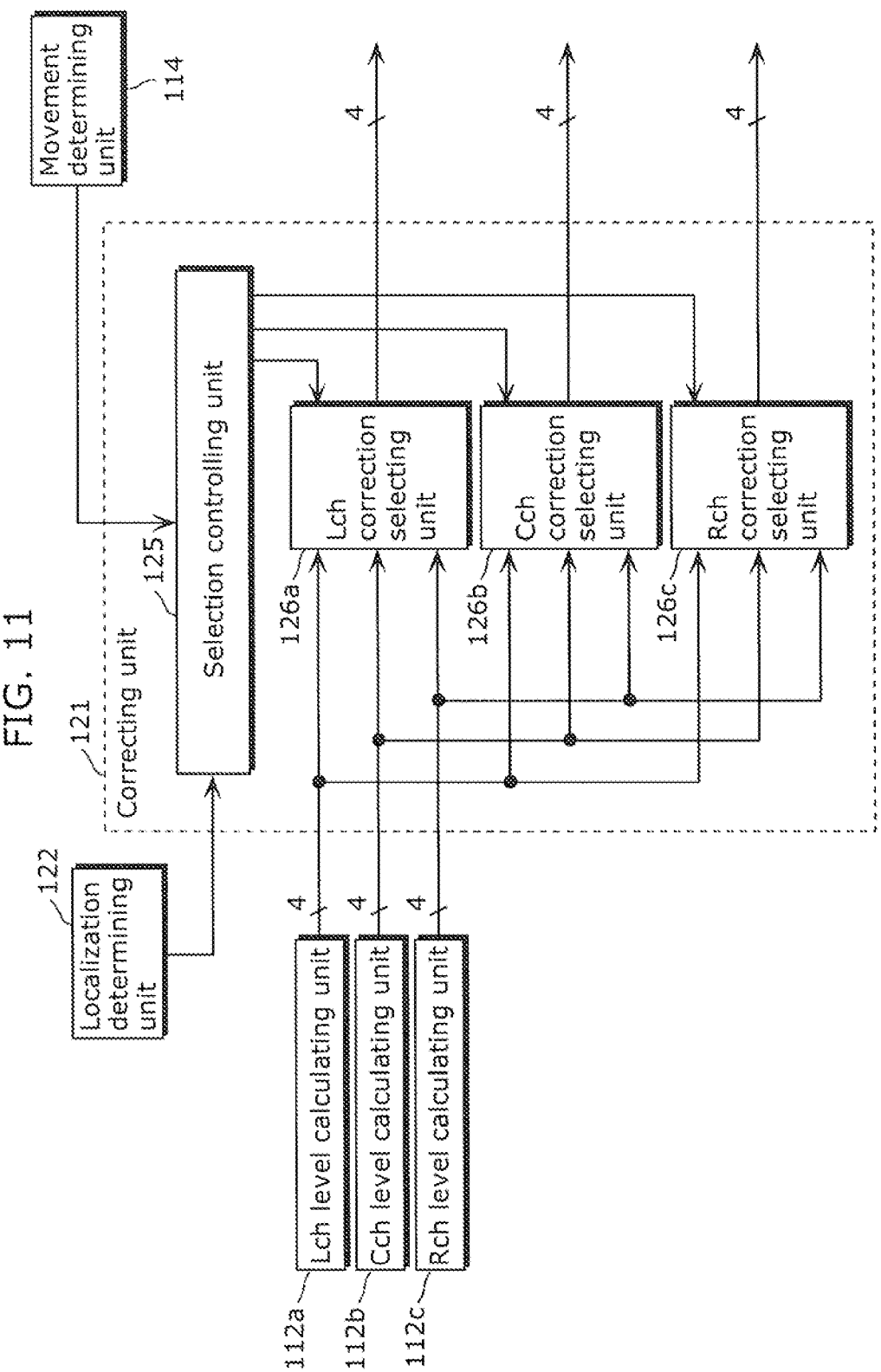
FIG. 11 is a block diagram showing the functional configuration in detail of a correcting unit according to Embodiment 5 of the present invention.

FIG. 11 is a block diagram showing the functional configuration in detail of the correcting unit 121 according to Embodiment 5 of the present invention. As shown in FIG. 11, the correcting unit 121 includes a selection controlling unit 125, an Lch correction selecting unit 126a, a Cch correction selecting unit 126b, and a Rch correction selecting unit 126c.

After the microphone 110 is moved, the correcting unit 121 corrects the signal power as shown below for the following cases: (1) the case where only the Lch level calculating unit 112a calculates the signal power; (2) the case where only the Cch level calculating unit 112b calculates the signal power; and (3) the case where only the Rch level calculating unit 112c calculates the signal power.

(1) The Cch correction selecting unit 126b corrects the signal power Px1b(t) to Px4b(t) calculated by the Cch level calculating unit 112b before the movement of the microphone 110 to the product between coefficient α1 and the signal power Px1a(t) to Px4a(t) calculated by the Lch level calculating unit 112a.

Similarly, the Rch correction selecting unit 126c corrects the signal power Px1c(t) to Px4c(t) calculated by the Rch level calculating unit 112c before the movement of the microphone 110 to the product between coefficient α1 and the signal power Px1a(t) to Px4a(t) calculated by the Lch level calculating unit 112a.

(2) The Lch correction selecting unit 126a corrects the signal power Px1a(t) to Px4a(t) calculated by the Lch level calculating unit 112a before the movement of the microphone 110 to the product between coefficient α2 and the signal power Px1b(t) to Px4b(t) calculated by the Cch level calculating unit 112b.

Similarly, the Rch correction selecting unit 126c corrects the signal power Px1c(t) to Px4c(t) calculated by the Rch level calculating unit 112c before the movement of the microphone 110 to the product between coefficient α2 and the signal power Px1b(t) to Px4b(t) calculated by the Cch level calculating unit 112b.

(3) The Lch correction selecting unit 126a corrects the signal power Px1a(t) to Px4a(t) calculated by the Lch level calculating unit 112a before the movement of the microphone 110 to the product between coefficient α3 and the signal power Px1c(t) to Px4c(t) calculated by the Rch level calculating unit 112c.

Similarly, the Cch correction selecting unit 126b corrects the signal power Px1b(t) to Px4b(t) calculated by the Cch level calculating unit 112b before the movement of the microphone 110 to the product between coefficient α3 and the signal power Px1c(t) to Px4c(t) calculated by the Rch level calculating unit 112c.

Next, the coefficients α2, α2, and α3 are described.

When move_flg as the determination result by the movement determining unit 114 is changed from 0 to 1 (when a still state is changed to a movement state), the selection controlling unit 125 sets α1=1, α2=1, and α3=1.

However, when the determination result by the localization determining unit 122 is dir_flg=0 (Lch localization), the selection controlling unit 125 changes to α1=0. Also, when the determination result by the localization determining unit 122 is dir_flg=1 (Cch localization), the selection controlling unit 125 changes to α2=0. Also, when the determination result by the localization determining unit 122 is dir_flg=2 (Rch localization), the selection controlling unit 125 changes to α3=0.

Figure 12:
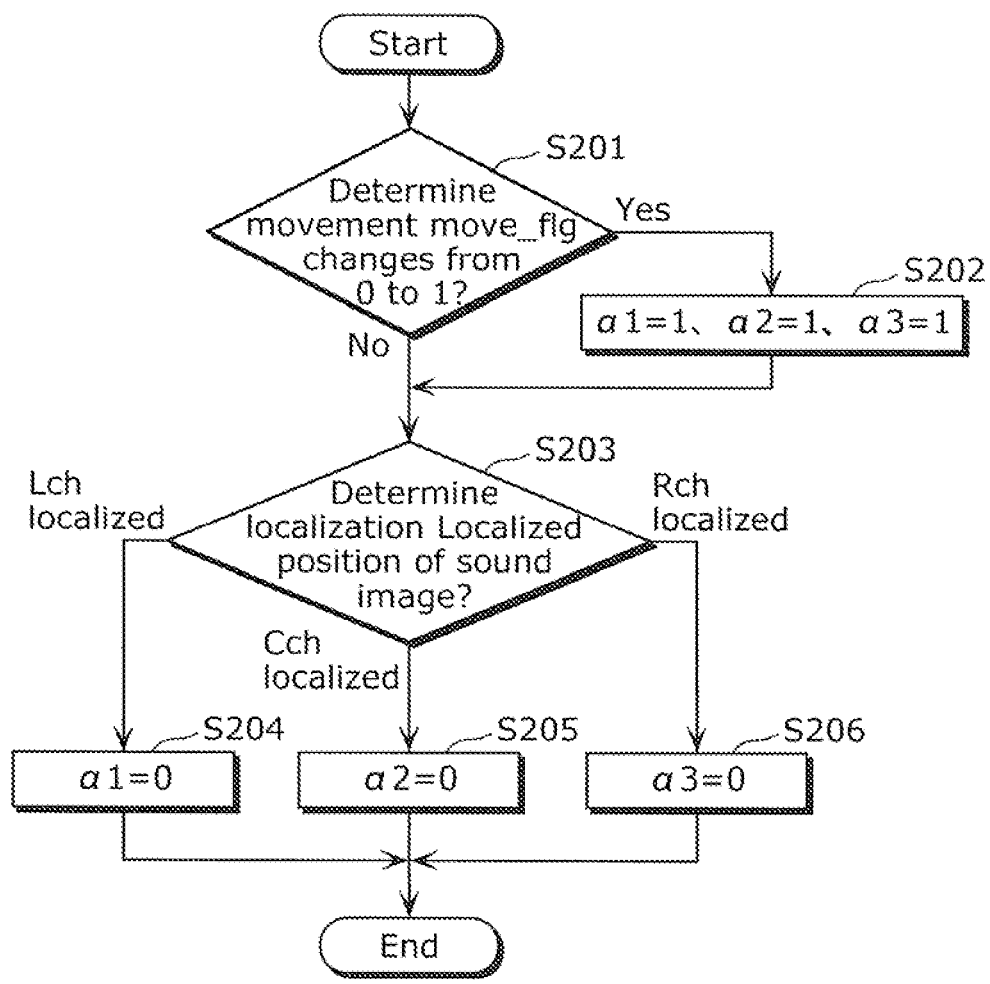
FIG. 12 is a flowchart showing the operation of a selection controlling unit according to Embodiment 5 of the present invention.

Next, the details of the operation of the selection controlling unit 125 when the coefficient α1, α2, and α3 are set are described by using FIG. 12.

FIG. 12 is a flowchart showing the operation of the selection controlling unit 125 according to Embodiment 5 of the present invention.

First, the selection controlling unit 125 determines whether a state in which the microphone 110 is determined to be still by the movement determining unit 114 has been changed to a state in which the microphone 110 is determined to be moved by the movement determining unit 114 (S201). In the case where the state of the microphone 110 is determined to be changed (Yes in S201), the selection controlling unit 125 sets the coefficients α1, α2, and α3 to "1" (S202).

On the other hand, in the case where the state of the microphone 110 is determined to be unchanged (No in S201), or after the coefficients α1, α2, and α3 are set to "1" in step S202, the selection controlling unit 125 acquires the sound image localized position determined by the localization determining unit 122 (S203).

Now, in the case where the acquired sound image localization position is Lch localization (dir_flg=0) (Lch localization in S203), the selection controlling unit 125 sets the coefficient α1 to "0" (S204). Also, in the case where the acquired sound image localization position is Cch localization (dir_flg=1) (Cch localization in S203), the selection controlling unit 125 sets the coefficient α2 to "0" (S205). Also, in the case where the acquired sound image localization position is Rch localization (dir_flg=2) (Rch localization in S203), the selection controlling unit 125 sets the coefficient α3 to "0" (S206).

As described above, according to the sound pickup apparatus 101 in the present embodiment, the signal power of the Lch level calculating unit 112a, the Cch level calculating unit 112b, and the Rch level calculating unit 112c is promptly updated even after the microphone 110 is moved. That is to say, even in the case where some sound image localized positions have not been updated after the microphone 110 is moved, the mixing coefficients after the movement of the microphone 110 can be calculated with a higher accuracy. Consequently, the sound pickup apparatus 101 can achieve more stable stereo sound pickup.

Alternatively, the signal power which is not updated in the correcting unit 121 may be reset rather than replaced by a signal.

The sound pickup apparatus 101 according to the present embodiment includes the correcting unit 121, but does not necessarily need to include the correcting unit 121. Also, the level calculating unit 112 according to the present embodiment includes the Lch level calculating unit 112a, the Cch level calculating unit 112b, and the Rch level calculating unit 112c, but does not necessarily need to include these processing units. For example, the sound pickup apparatus 101 may have a functional configuration as shown in FIG. 13.

In this case, when the microphone 110 is determined to be moved, the mixing ratio calculating unit 113 may calculate the mixing coefficients of the sound image localized positions whose signal levels are not calculated yet after the microphone 110 is determined to be moved by using the signal levels of the sound image localized positions whose signal levels are already calculated after the microphone 110 is determined to be moved. Specifically, for example, in the case where only the signal levels in Lch localization are calculated after the microphone 110 is determined to be moved, the mixing ratio calculating unit 113 may calculate the mixing coefficients in Cch localization, and the mixing coefficient in Rch localization by using the signal levels in Lch localization.

Figure 13:
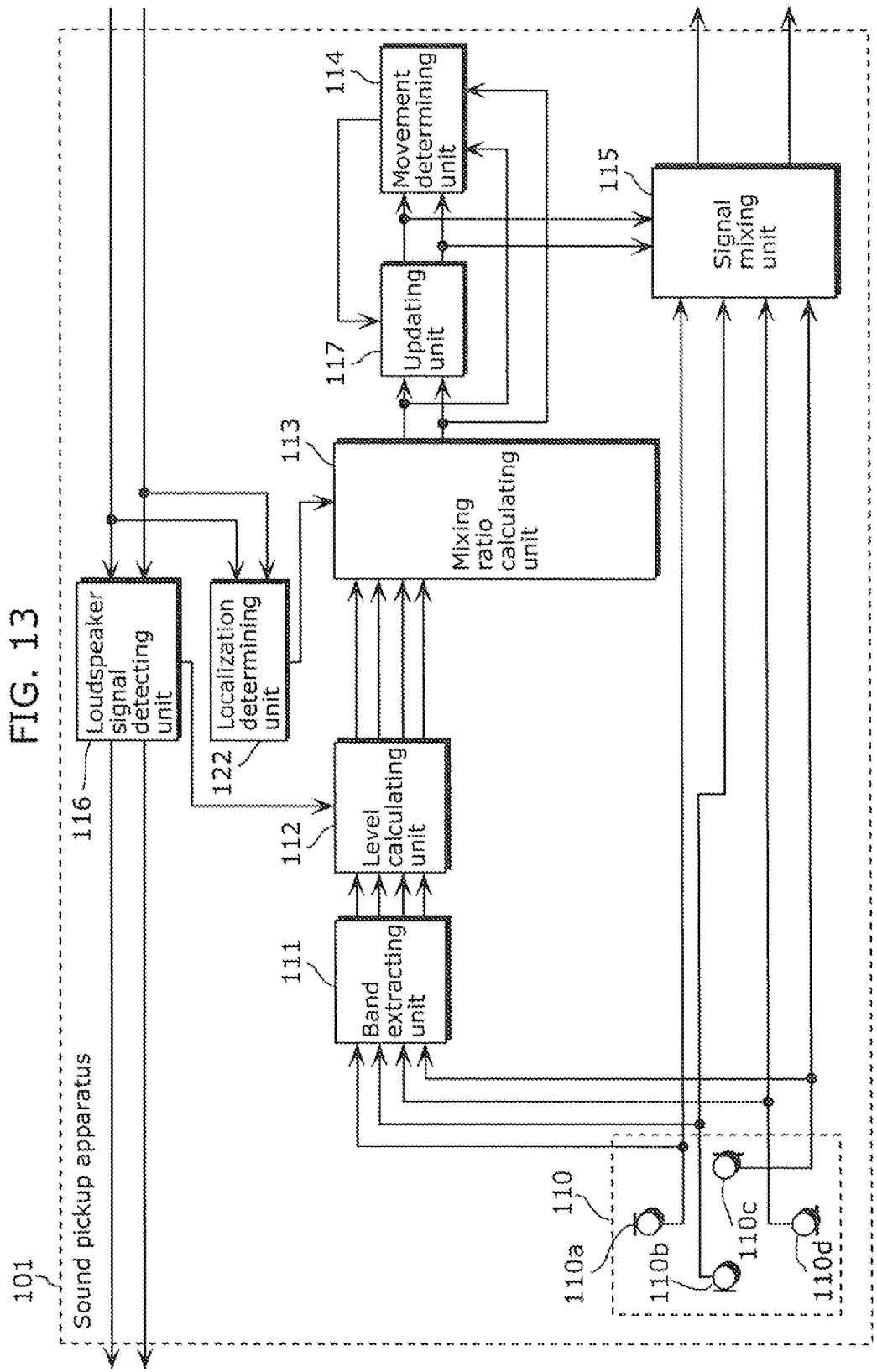
FIG. 13 is a block diagram showing the functional configuration of a sound pickup apparatus according to a modification example of Embodiment 5 of the present invention.

Thereby, even with the sound pickup apparatus 101 shown in FIG. 13, effects similar to those of the sound pickup apparatus 101 shown in FIG. 10 can be achieved.

So far, the sound pickup apparatus 101 according to one aspect of the present invention is described based on the embodiments, however, the present invention is not limited to these embodiments. As long as not departing from the spirit of the present invention, various modifications made to the present embodiment by those skilled in the art, and embodiment which is constructed by mixing components in different embodiments are also included in the scope of the present embodiment.

Figure 14A:
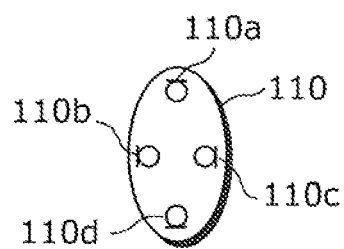
FIG. 14A is a diagram showing the configuration of a microphone according to a modification example of an embodiment of the present invention.
Figure 14B:
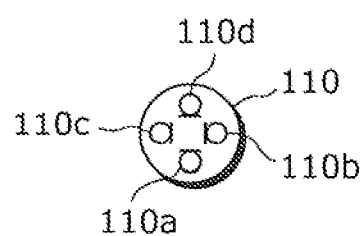
FIG. 14B is a diagram showing the configuration of a microphone according to a modification example of an embodiment of the present invention.
Figure 14C:
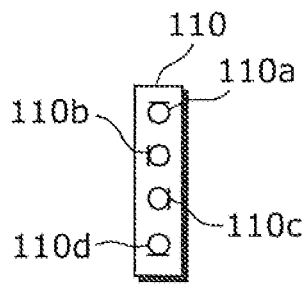
FIG. 14C is a diagram showing the configuration of a microphone according to a modification example of an embodiment of the present invention.

For example, each sound pickup unit may be placed in a different configuration from that in the above-described embodiments. For example, as shown in FIG. 14A, the first to fourth sound pickup units 110a to 110d may be arranged to be placed at different positions for every 90 degree on an ellipse rather than a circle. Also, as shown in FIG. 14B, the first to fourth sound pickup units 110a to 110d may be placed so as to have the main axis directions of directivity from the center of each circle to the inner side, and separated by 90 degrees. Also, as shown in FIG. 14C, the first to fourth sound pickup units 110a to 110d may be arranged in a line. Even in this case, the sound pickup apparatus 101 can achieve effects similar to those of the sound pickup apparatus 101 according to the above-described embodiments.

Figure 14D:
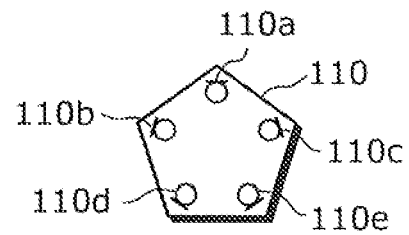
FIG. 14D is a diagram showing the configuration of a microphone according to a modification example of an embodiment of the present invention.

Also, as shown in FIG. 14D, the microphone 110 may include the first to fifth sound pickup units 110a to 110e. In FIG. 14D, the microphone 110 may include the first to fifth sound pickup units 110a to 110e are placed so as to have the main axis directions of directivity separated by 72 degrees. With the mixing coefficients calculated similarly to Embodiment 1, a stereo signal generated by the signal mixing unit 115 is equivalent to a signal picked up in stereo from two sound pickup directions which are different from each other by 144 degrees.

Thus, even with the sound pickup apparatus 101 provided with the microphone 110 shown in FIG. 14D, sound from a sound source located in the periphery of the microphone 110 can be picked up in stereo somewhat clearly although not so efficiently as the sound pickup apparatus 101 according to the above-described embodiment. The microphone 110 may include further more sound pickup units.

Also, in the above-described embodiment, the sound pickup system includes the monitor 104 and the camera 105; but does not necessarily need to include the monitor 104 and the camera 105. In the case where the sound pickup system does not include the monitor 104 and the camera 105, the sound pickup apparatus 101 cannot match an image with its sound image, but can pick up sound in stereo clearly from a sound source located in the periphery of the microphone 110. For example, in a voice conference system such as a teleconference system, the sound pickup apparatus 101 can generate a stereo signal which allows a sound image to be localized at a location according to the position of a sound source, thus clarity of sound can be improved.

Also, in the above-described embodiment, the mixing ratio calculating unit 113 calculates mixing coefficients, in each of four sound pickup units, by using signal levels of the sound pickup unit located next to the relevant sound pickup unit, but does not necessarily need to calculate the mixing coefficients in this manner. For example, the mixing ratio calculating unit 113 may refer to a table and calculate the mixing coefficients corresponding to signal levels of each sound pickup unit. In this case, the sound pickup apparatus 101 may include, for example, a storage unit which holds a table for storing mixing coefficients associated with the ratio of signal levels of respective sound pickup units. Even in this case, sound from a sound source can be picked up in stereo without measuring the position of the microphone.

Also, in the above-described embodiments, the sound pickup apparatus 101 calculates the mixing ratio by using reception signals transmitted from the sound pickup system of the communication partner site, but does not necessarily need to use the reception signals. For example, the sound pickup apparatus 101 may generate loudspeaker signals for calculating the mixing coefficients. In this case, the loudspeaker signal is preferably a signal for reproducing sound whose frequency does not interfere with the sound reproduced from the reception signal. Accordingly, the sound pickup apparatus 101 can calculate mixing coefficients without interrupting a conference.

Also, in the above-described embodiments, the number of loudspeakers is two, but may be other number.

Also, in the above-described embodiments, the sound pickup apparatus 101 includes each component shown in FIG. 3, but does not necessarily need to include all the components shown in FIG. 3. For example, the sound pickup apparatus 101 may include a part of the components shown in FIG. 3 as shown in FIG. 15.

Figure 15:
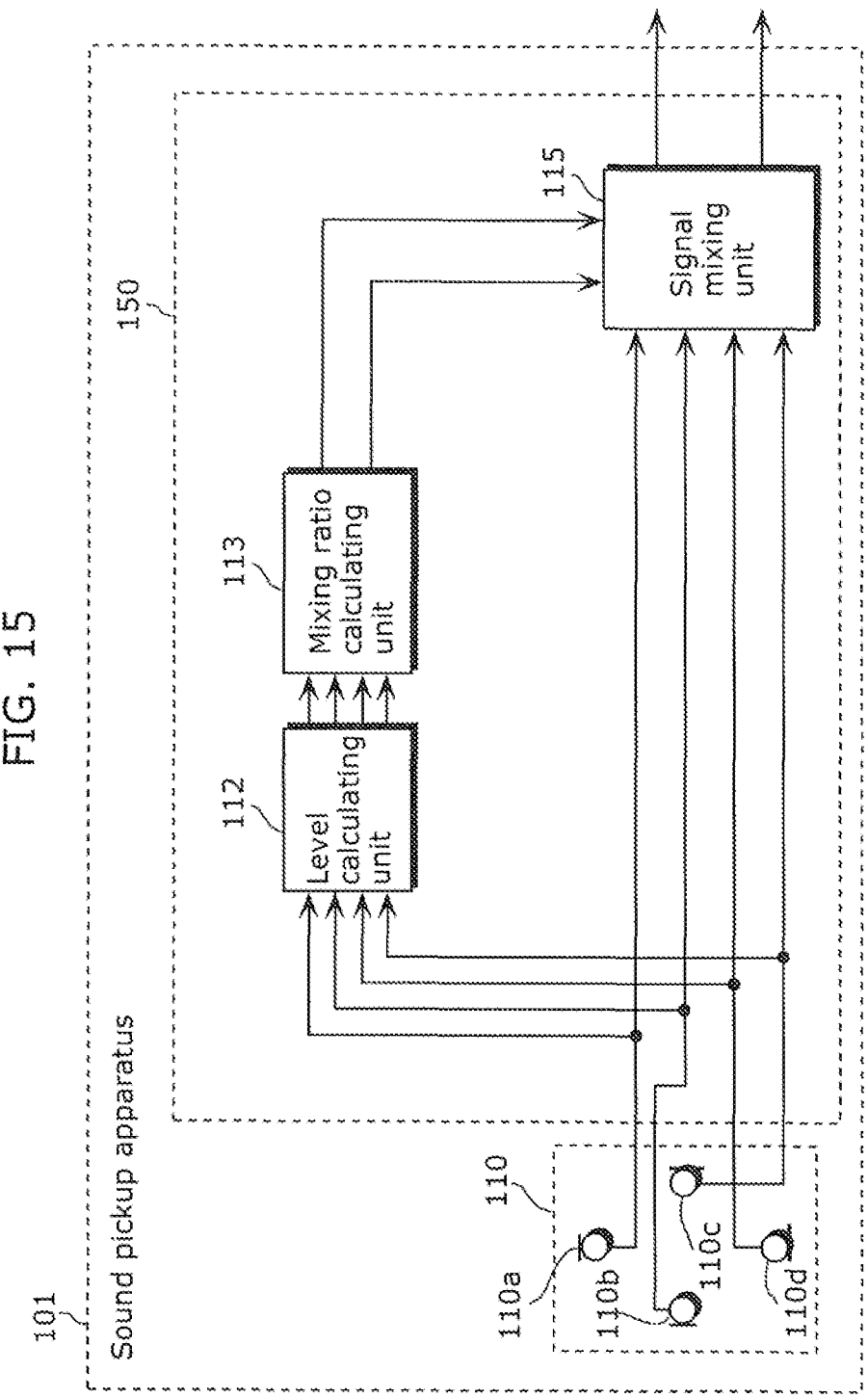
FIG. 15 is a block diagram showing the function configuration of a sound pickup apparatus according to a modification example of an embodiment of the present invention.

FIG. 15 is a block diagram showing the function configuration of the sound pickup apparatus 101 according to a modification example of an embodiment of the present invention. In FIG. 15, the sound pickup apparatus 101 includes the microphone 110, the level calculating unit 112, the mixing ratio calculating unit 113, and the signal mixing unit 115.

Even the sound pickup apparatus 101 has the configuration as shown in FIG. 15, effects similar to those of the sound pickup apparatus 101 according to Embodiment 1 can be achieved by calculating signal levels of the sound outputted from loudspeakers in the level calculating unit 112.

Also, the following cases are included in the present invention.

(1) Specifically, each of the above-described apparatus is a computer system including a microprocessor, ROM (Read Only Memory), a RAM (Random Access Memory), a hard disk unit, a display unit, a keyboard, a mouse. The RAM or the hard disk unit stores a computer program. Each apparatus achieves its function by the operation of the microprocessor according to the computer program. The computer program is configured with a combination of multiple operation codes which instruct the computer in order to achieve predetermined functions.

(2) A part or all of the components included in the above-mentioned apparatus may include 1 system LSI (Large Scale Integration). For example, as shown in FIG. 15, a system LSI 150 includes the level calculating unit 112, the mixing ratio calculating unit 113, and the signal mixing unit 115. The system LSI is a super-multifunctional LSI manufactured by integrating multiple component units into 1 chip, and is specifically, a computer system including a microprocessor, a ROM, a RAM, and the like. The RAM stores a computer program. The system LSI achieves its function by the operation of the microprocessor according to the computer program.

(3) A part or all of the components included in the above-mentioned apparatus may include an IC card which is detachably attached to each apparatus, or a single module. The IC card or the module is a computer system which includes a microprocessor, a ROM, a RAM, and the like. The IC card or the module may include the above-mentioned super-multifunctional LSI. The IC card or the module achieves its function by the operation of the microprocessor according to the computer program. The IC card or the module may have tamper resistant.

(4) The present invention may be one of the methods shown above. Alternatively, the present invention may be a computer program which implements these methods by a computer, or digital signals which are formed with the computer program.

Also, the present invention may be computer readable recording medium, for example, a flexible disk, a hard disk, a CD-ROM, an MO, a DVD, a DVD-ROM, a DVD-RAM, a BD (Blu-ray Disc (registered trademark)), and a semiconductor memory, which records the computer program or the digital signal. Also, the present invention may be the digital signal recorded on these recording media.

Also, the present invention may be transmission means which transmits the computer program or the digital signal via an electric telecommunication line, a radio or wire communication line, a network represented by the Internet, and a data broadcast.

Also, the present invention may be a computer system including a microprocessor and a memory; the memory stores the above-mentioned computer program; and the microprocessor operates according to the computer program.

Also, the present invention may be implemented by other independent computer system through recording the program or the digital signal on the above-mentioned recording medium to be transferred, or through transferring the program or the digital signal via the network.

(5) The above-described embodiments and the modification may be combined.

INDUSTRIAL APPLICABILITY

The sound pickup apparatus according to one aspect of the present invention can clearly pick up sound in stereo from a sound source located in the periphery of a microphone, and is useful, especially as a video conference system, or a voice conference system.

REFERENCE SIGNS LIST

100 First sound pickup system
101, 201 Sound pickup apparatus
102a, 102b Speaker
103 Table
104, 204 Monitor
105, 205 Camera
106a, 106b, 206a, 206b Loudspeaker
107 Communication network
110 Microphone
110a, 110b, 110c, 110d Sound pickup unit
111 Band extracting unit
112 Level Calculating Unit
112a Lch level calculating unit
112b Cch level calculating unit
112c Rch level calculating unit
113 Mixing ratio calculating unit
114 Movement determining unit
115 Signal mixing unit
116 Loudspeaker signal detecting unit
117 Updating unit
121 Correcting unit
122 Localization determining unit
123 Variation detecting unit
124 Variation determining unit
125 Selection controlling unit
126a Lch correction selecting unit
126b Cch correction selecting unit
126c Rch correction selecting unit
150 System LSI
200 Second sound pickup system

The invention claimed is:

1. A sound pickup apparatus comprising:
a microphone including 4 sound pickup units placed so as to have main axis directions of directivity separated by 90 degrees, the microphone being installed in a position where sound outputted from a loudspeaker, which reproduces a voice signal received from a communication partner site, can be picked up;
a level calculating unit configured to calculate a signal level of sound outputted from the loudspeaker for each output signal of the 4 sound pickup units;
a mixing coefficient calculating unit configured to calculate a mixing coefficient adjusted to main axis directions of directivity of the 4 sound pickup units by using the signal level calculated by said level calculating unit, the mixing coefficient being for generating a stereo signal including a R channel signal whose main axis of directivity is inclined to the left with respect to a direction from the microphone to the loudspeaker, and a L channel signal whose main axis of directivity is inclined to the right with respect to the direction from the microphone to the loudspeaker; and
a signal mixing unit configured to generate a stereo signal by mixing output signals of the 4 sound pickup units by using a mixing coefficient calculated by said mixing coefficient calculating unit,
wherein the mixing coefficient includes a first mixing coefficient for generating the R channel signal, and a second mixing coefficient for generating the L channel signal,
wherein for each one of the 4 sound pickup units, said mixing coefficient calculation unit is configured to calculate the first mixing coefficient by using a signal level of another sound pickup unit located to the left of the sound pickup unit, and calculate the second mixing coefficient by using a signal level of another sound pickup unit located to the right of the sound pickup unit, and
wherein said signal mixing unit is configured to generate the R channel signal by multiplying output signals of the 4 sound pickup units by the respective first mixing coefficients and adding the multiplied output signals together, and generate the L channel signal by multiplying output signals of the 4 sound pickup units by the respective second mixing coefficients and adding the multiplied output signals together.

2. The sound pickup apparatus according to claim 1, further comprising
a loudspeaker signal detecting unit configured to determine whether a loudspeaker signal for outputting sound from the loudspeaker is present or not,
wherein said level calculating unit is configured to calculate the signal level in a case where a loudspeaker signal is determined to be present by said loudspeaker signal detecting unit.

3. The sound pickup apparatus according to claim 1, further comprising
a movement determining unit configured to determine whether said microphone is moved or not,
wherein said mixing coefficient calculating unit sets a higher frequency of calculation of the mixing coefficient for a case where said microphone is determined to be moved than for a case where said microphone is determined to be still.

4. The sound pickup apparatus according to claim 3,
wherein said movement determining unit determines whether said microphone is moved or not based on a rate of change of the mixing coefficient calculated by said mixing coefficient calculating unit.

5. The sound pickup apparatus according to claim 1, further comprising
a localization determining unit configured to determine a sound image localized position from a loudspeaker signal for outputting sound from the loudspeaker,
wherein said mixing coefficient calculating unit is configured to calculate the mixing coefficient for each sound image localized position determined by said localization determining unit, and
wherein said signal mixing unit combines output signals of the 4 sound pickup units by using an average of mixing coefficient for each sound image localized position calculated by said mixing coefficient calculating unit.

6. The sound pickup apparatus according to claim 5,
wherein said localization determining unit determines one of left localization, right localization, and center localization, as a sound image localized position, each localization indicating a relative positional relationship between the sound image localized position and the loudspeaker, and
wherein said level calculating unit includes:
Lch level calculating unit configured to calculate the signal level in a case where sound image localized position is determined to be the left localization by said localization determining unit,
Rch level calculating unit configured to calculate the signal level in a case where sound image localized position is determined to be the right localization by said localization determining unit, and
Cch level calculating unit configured to calculate the signal level in a case where sound image localized position is determined to be the center localization by said localization determining unit.

7. The sound pickup apparatus according to claim 5, further comprising a movement determining unit configured to determine whether said microphone is moved or not, wherein in a case where said microphone is determined to be moved, said mixing ratio calculating unit calculates a mixing coefficient of a sound image localized position whose signal level is not calculated yet after said microphone is determined to be moved by using a signal level of a sound image localized position whose signal level is already calculated after said microphone is determined to be moved.

8. The sound pickup apparatus according to claim 1, further comprising a band extracting unit configured to extract a signal in a predetermined frequency band from each of output signals of the 4 sound pickup units, wherein said level calculating unit calculates the signal level using a signal extracted by said band extracting unit.

9. The sound pickup apparatus according to claim 8, wherein the predetermined frequency band is a voice band.

10. A sound pickup method for generating a stereo signal by using a microphone which has 4 sound pickup units placed so as to have main axis directions of directivity separated by 90 degrees, the microphone being installed in a position where sound outputted from a loudspeaker, which reproduces a voice signal received from a communication partner site, can be picked up, said sound pickup method comprising:

calculating a signal level of sound outputted from the loudspeaker for each output signal of the 4 sound pickup units;

calculating a mixing coefficient adjusted to main axis directions of directivity of the 4 sound pickup units by using a signal level calculated in said calculating of a signal level, the mixing coefficient being for generating a stereo signal including a R channel signal whose main axis of directivity is inclined to the left with respect to a direction from the microphone to the loudspeaker, and a L channel signal whose main axis of directivity is inclined to the right with respect to the direction from the microphone to the loudspeaker; and generating a stereo signal by mixing the output signals of the 4 sound pickup units by using a mixing coefficient calculated in said calculating of a mixing coefficient, wherein the mixing coefficient includes a first mixing coefficient for generating the R channel signal, and a second mixing coefficient for generating the L channel signal, wherein for each one of the 4 sound pickup units, said calculating the mixing coefficient includes calculating the first mixing coefficient by using a signal level of another sound pickup unit located to the left of the sound pickup unit, and calculating the second mixing coefficient by using a signal level of another sound pickup unit located to the right of the sound pickup unit, and wherein said generating the stereo signal includes generating the R channel signal by multiplying output signals of the 4 sound pickup units by the respective first mixing coefficients and adding the multiplied output signals together, and generating the L channel signal by multiplying output signals of the 4 sound pickup units by the respective second mixing coefficients and adding the multiplied output signals together.

11. A program causing a computer to execute the sound pickup method, the program being recorded on a computer readable, non-temporary recording medium according to claim 10.

12. An integrated circuit for generating a stereo signal by using a microphone which has 4 sound pickup units placed so as to have main axis directions of directivity separated by 90 degrees, the microphone being installed in a position where sound outputted from a loudspeaker, which reproduces a voice signal received from a communication partner site, can be picked up, said integrated circuit comprising:

a level calculating unit configured to calculate a signal level of sound outputted from the loudspeaker for each output signal of the 4 sound pickup units;

a mixing coefficient calculating unit configured to calculate a mixing coefficient adjusted to main axis directions of directivity of the 4 sound pickup units by using a signal level calculated by said level calculating unit, the mixing coefficient being for generating a stereo signal including a R channel signal whose main axis of directivity is inclined to the left with respect to a direction from the microphone to the loudspeaker, and a L channel signal whose main axis of directivity is inclined to the right with respect to the direction from the microphone to the loudspeaker; and a signal mixing unit configured to generate a stereo signal by mixing output signals of the 4 sound pickup units by using a mixing coefficient calculated by said mixing coefficient calculating unit, wherein the mixing coefficient includes a first mixing coefficient for generating the R channel signal, and a second mixing coefficient for generating the L channel signal, wherein for each one of the 4 sound pickup units, said mixing coefficient calculation unit is configured to calculate the first mixing coefficient by using a signal level of another sound pickup unit located to the left of the sound pickup unit, and calculate the second mixing coefficient by using a signal level of another sound pickup unit located to the right of the sound pickup unit, and wherein said signal mixing unit is configured to generate the R channel signal by multiplying output signals of the 4 sound pickup units by the respective first mixing coefficients and adding the multiplied output signals together, and generate the L channel signal by multiplying output signals of the 4 sound pickup units by the respective second mixing coefficients and adding the multiplied output signals together.

* * * * *